United States Patent
Eun

(10) Patent No.: US 9,934,718 B2
(45) Date of Patent: Apr. 3, 2018

(54) ELECTROLUMINESCENT DISPLAY DEVICE, SYSTEM INCLUDING THE SAME AND METHOD OF DRIVING THE SAME

(71) Applicant: SAMSUNG DISPLAY CO., LTD., Yongin, Gyeonggi-Do (KR)

(72) Inventor: Dong-Ki Eun, Suwon-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 216 days.

(21) Appl. No.: 14/698,949

(22) Filed: Apr. 29, 2015

(65) Prior Publication Data

US 2016/0140894 A1    May 19, 2016

(30) Foreign Application Priority Data

Nov. 17, 2014    (KR) .................. 10-2014-0159962

(51) Int. Cl.
| | | |
|---|---|---|
| *G09G 3/30* | (2006.01) | |
| *G09G 3/32* | (2016.01) | |
| *G09G 3/00* | (2006.01) | |
| *H04N 13/04* | (2006.01) | |

(Continued)

(52) U.S. Cl.
CPC .............. *G09G 3/30* (2013.01); *G09G 3/003* (2013.01); *G09G 3/3233* (2013.01); *H04N 13/0438* (2013.01); *H04N 13/0452* (2013.01); *G09G 3/3225* (2013.01); *G09G 2320/029* (2013.01); *G09G 2320/043* (2013.01); *G09G 2320/08* (2013.01); *G09G 2330/02* (2013.01); *G09G 2330/021* (2013.01); *G09G 2330/12* (2013.01)

(58) Field of Classification Search
None
See application file for complete search history.

(56) References Cited

U.S. PATENT DOCUMENTS

| | | |
|---|---|---|
| 2003/0234892 A1 | 12/2003 | Hu |
| 2011/0298396 A1* | 12/2011 | Kimura .................. G09G 3/14 315/307 |
| 2012/0194660 A1 | 8/2012 | Nakamura et al. |

(Continued)

FOREIGN PATENT DOCUMENTS

| | | |
|---|---|---|
| EP | 1 231 592 A2 | 8/2002 |
| EP | 2 282 307 A1 | 2/2011 |

(Continued)

OTHER PUBLICATIONS

European Search Report dated Feb. 8, 2016 in Corresponding European Patent Application No. 15172590.0.

*Primary Examiner* — Patrick Edouard
*Assistant Examiner* — Maheen Javed
(74) *Attorney, Agent, or Firm* — Lee & Morse, P.C.

(57) ABSTRACT

A method for driving an electroluminescent display device includes generating a current detection signal corresponding to an average value of a global current per voltage control based on the global current provided to the display panel, controlling at least one of a first power supply voltage or a second power supply voltage based on the current detection signal, and changing the voltage control period based on an operation mode of the display device. The display device operates in a two-dimensional mode for displaying a planar image or a three-dimensional mode for displaying a stereoscopic image.

16 Claims, 21 Drawing Sheets

(51) Int. Cl.
  *G09G 3/3233* (2016.01)
  *G09G 3/3225* (2016.01)

(56) References Cited

U.S. PATENT DOCUMENTS

2015/0161940 A1* 6/2015 Woo ....................... G09G 3/003
                                                         345/58
2015/0237337 A1* 8/2015 Wang ................. H04N 13/0454
                                                        386/230

FOREIGN PATENT DOCUMENTS

| JP | 2013142868 A | * | 7/2013 | | |
|----|---|---|---|---|---|
| KR | 10-2012-0038224 A | | 4/2012 | | |
| KR | 10-2012-0044733 A | | 5/2012 | | |
| KR | 10-2013-0008616 | | 1/2013 | | |
| KR | 20150068154 A | * | 6/2015 | ............. | G09G 3/003 |

* cited by examiner

FIG. 14

ELECTROLUMINESCENT DISPLAY DEVICE, SYSTEM INCLUDING THE SAME AND METHOD OF DRIVING THE SAME

CROSS REFERENCE TO RELATED APPLICATION

Korean Patent Application No. 10-2014-0159962, filed on Nov. 17, 2014, and entitled, "Electroluminescent Display Device, System Including the Same and Method of Driving the Same," is incorporated by reference herein in its entirety.

BACKGROUND

1. Field

One or more embodiments described herein relate to an electroluminescent display device, a system including an electroluminescent display device, and a method for driving an electroluminescent display device.

2. Description of the Related Art

An electroluminescent display may be driven with relatively fast response speed and reduced power consumption. This is possible, in part, by using pixels that emit light from light-emitting diodes or organic light-emitting diodes. An OLED generates light based on a recombination of electrons and holes in an emission layer between two electrodes. The emission layer includes materials that generate light based on a driving current flowing between the electrodes. The luminance of the display is determined by the driving current in each OLED, e.g., higher driving currents produce brighter light emission.

In an electroluminescent display, the driving current is directly proportional to the driving voltage. The driving voltage is based on a difference between a high and low power supply voltages. As the driving voltage increases, the quality of a displayed image may be enhanced, but at the cost of increased power consumption.

SUMMARY

In accordance with one or more embodiments, a method for driving an electroluminescent display device includes generating a current detection signal corresponding to an average value of a global current per voltage control period based on the global current provided to the display panel; controlling at least one of a first power supply voltage or a second power supply voltage based on the current detection signal; and changing the voltage control period based on an operation mode of the display device, the display device operating in a two-dimensional mode for displaying a planar image and a three-dimensional mode for displaying a stereoscopic image.

Changing the voltage control period may include increasing the voltage control period when the operation mode is to change from the two-dimensional mode to the three-dimensional mode, and decreasing the voltage control period when the operation mode is to change from the three-dimensional mode to the two-dimensional mode.

The voltage control period of the three-dimensional mode may include a sensing time interval for sensing the global current and a standby time interval after the sensing time interval. In the three-dimensional mode, the sensing time interval may correspond to a plurality of frame periods and the standby time interval corresponds to at least one frame period. The voltage control period of the two-dimensional mode may correspond to one frame period.

Controlling at least one of the first power supply voltage or the second power supply voltage may include calculating a target value of the global current based on input image data; calculating a voltage offset based on the target value and the average value of the global current; and controlling a voltage level of the first power supply voltage based on the voltage offset.

Calculating the voltage offset may include calculating a difference between the target value and the average value in the two-dimensional mode; and calculating the voltage offset based on the difference between the target value and the average value.

Calculating the voltage offset may include calculating a compensated target value corresponding to a half of the target value in the three-dimensional mode; calculating a difference between the compensated target value and the average value; and calculating the voltage offset based on the difference between the compensated target value and the average value.

Calculating the voltage offset may include calculating a compensated average value corresponding to double the average value in the three-dimensional mode; calculating a difference between the target value and the compensated average value; and calculating the voltage offset based on the difference between the target value and the compensated average value.

Generating the current detection signal may include generating a red current detection signal representing an average value of a red global current per voltage control period by sensing the red global current provided to red pixels in the display panel; generating a green current detection signal representing an average value of a green global current per voltage control period by sensing the green global current provided to green pixels in the display panel; and generating a blue current detection signal representing an average value of a blue global current per voltage control period by sensing the blue global current provided to blue pixels in the display panel.

Controlling at least one of the first power supply voltage or the second power supply voltage may include controlling a red first power supply voltage provided to the red pixels based on the red current detection signal; controlling a green first power supply voltage provided to the green pixels based on the green current detection signal; and controlling a blue first power supply voltage provided to the blue pixels based on the blue current detection signal.

The method may include alternatively displaying a left-eye image and a right-eye image forming the stereoscopic image in the three-dimensional mode. Alternatively displaying the left-eye image and the right-eye image may include sequentially writing black data to a portion of pixel rows during a portion of a first frame period; sequentially writing left-eye image data to the pixel rows during the remaining portion of the first frame period and during a second frame period; driving the pixel rows to simultaneously emit light during a first emission period corresponding to the second frame period; sequentially writing the black data to the portion of the pixel rows during a portion of a third frame period; sequentially writing right-eye image data to the pixel rows during the remaining portion of the third frame period and during a fourth frame period; and driving the pixel rows to simultaneously emit light during a second emission period corresponding to the fourth frame period.

The method may include applying the low power supply voltage having a first voltage level to the pixel rows during a first non-emission period corresponding to the first frame period and during a second non-emission period corresponding to the third frame period such that the pixel rows do not emit light; and applying the low power supply voltage having a second voltage level lower than the first voltage level to the pixel rows during the first emission period and during the second emission period such that the pixel rows emit light.

The method may include applying an emission control signal having a first voltage level to the pixel rows during a first non-emission period corresponding to the first frame period and during a second non-emission period corresponding to the third frame period such that the pixel rows do not emit light; and applying the emission control signal having a second voltage level to the pixel rows during the first emission period and during the second emission period such that the pixel rows emit light.

The display panel may include an upper display panel having upper pixel rows of the pixel rows and a lower display panel having lower pixel rows of the pixel rows and the upper display panel and the lower display panel are respectively driven by different data drivers.

The black data, the left-eye image data, and the right-eye image data may be sequentially written to the upper pixel rows in a first direction from top to bottom of the upper display panel, and the black data, the left-eye image data and the right-eye image data may be sequentially written to the lower pixel rows in the first direction from the top to the bottom of the lower display panel.

The black data, the left-eye image data, and the right-eye image data may be sequentially written to the upper pixel rows in a first direction from the top to the bottom of the upper display panel, and the black data, the left-eye image data and the right-eye image data may be sequentially written to the lower pixel rows in a second direction from the bottom to the top of the lower display panel.

In accordance with one or more other embodiments, an electroluminescent display device includes a display panel including a plurality of pixels operating based on a first power supply voltage and a second power supply voltage; a power supply to generate the first power supply voltage and the second power supply voltage based on an input voltage and a voltage control signal; a current detector to generate a current detection signal, representing an average value of a global current per voltage control period, by sensing the global current provided to the display panel based on a current detection control signal representing the voltage control period; and a voltage controller to generate the current detection control signal, such that the voltage control period is changed depending on an operation mode of the display device, wherein the display device is to operate in a two-dimensional mode for displaying a planar image or a three-dimensional mode for displaying a stereoscopic image, and wherein the voltage controller is to generate the voltage control signal based on the current detection signal.

In accordance with one or more other embodiments, a system includes an electroluminescent display device to selectively operate in a two-dimensional mode for displaying a planar image or in a three-dimensional mode for displaying a stereoscopic image based on a synchronization control signal; a shutter glasses to alternately open a left shutter and a right shutter based on the synchronization control signal; and a stereoscopic display synchronization device to generate the synchronization control signal, such that the shutter glasses open the left shutter when the electroluminescent display device displays a left image of the stereoscopic image and the shutter glasses open the right shutter when the electroluminescent display device displays a right image of the stereoscopic image, wherein the electroluminescent display device is to: generate a current detection signal, representing an average value of a global current per voltage control period, by sensing the global current provided to a display panel including a plurality of pixels operating based on a first power supply voltage and a second power supply voltage, control at least one of the first power supply voltage or the second power supply voltage based on the current detection signal, and change the voltage control period depending on whether the display device is operating in the three-dimensional mode or the two-dimensional mode.

BRIEF DESCRIPTION OF THE DRAWINGS

Features will become apparent to those of skill in the art by describing in detail exemplary embodiments with reference to the attached drawings in which:

FIG. 14 illustrates an embodiment of a method for writing data in an electroluminescent display;

DETAILED DESCRIPTION

Figure 1:
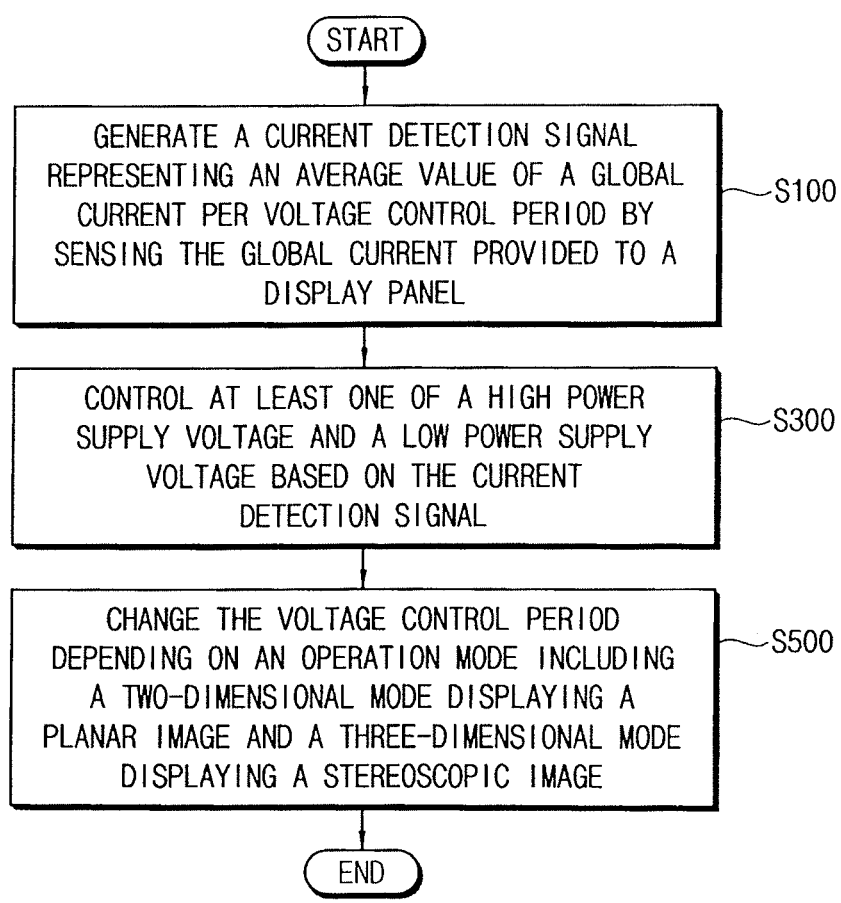
FIG. 1 illustrates an embodiment of a method for driving an electroluminescent display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a method for driving an electroluminescent display device. Referring to FIG. 1, the method includes generating a current detection signal CDET, that represents an average value of a global current GI per voltage control period tVC, by sensing the global current provided to a display panel (S100).

The display panel includes a plurality of pixels operating based on a first (e.g., high) power supply voltage ELVDD and a second (e.g., low) power supply voltage ELVSS. The high power supply voltage ELVDD may have a positive voltage level. The low power supply voltage ELVSS may have a negative voltage level or a ground voltage level. The global current GI corresponds to a sum of driving currents flowing through at least a portion of the pixels, respectively. In some example embodiments, the global current GI may correspond to the sum of the driving currents of all of the pixels in the display panel. In other example embodiments, the global current GI may correspond to the sum of the driving currents of one of red pixels, green pixels, or blue pixels among the pixels in the display panel.

At least one of the high power supply voltage ELVDD or the low power supply voltage ELVSS is controlled based on the current detection signal CDET (S300). The pixels receive the high power supply voltage ELVDD and the low power supply voltage ELVSS, and generate the respective driving currents depending on the driving voltages to display an image. The driving voltage is based on to a difference of the high power supply voltage ELVDD and the low power supply voltage ELVSS.

The driving voltage and the driving current may be increased, for example, by increasing the high power supply voltage ELVDD or decreasing the low power supply voltage ELVSS. The driving voltage and the driving current may be decreased, for example, by decreasing the high power supply voltage ELVDD or increasing the low power supply voltage ELVSS.

In some example embodiments, the high power supply voltage ELVDD may be controlled independently for each of the red pixels, the green pixels, and the blue pixels. The low power supply voltage ELVSS may be controlled commonly for all of the red pixels, the green pixels, and the blue pixels. In this case, the current detection signals CDET may be generated independently for each of the red pixels, the green pixels and the blue pixels. The high power supply voltage ELVDD may be controlled independently per color pixel based on the current detection signals CDET.

The voltage control period is changed depending on an operation mode (S500). The operation mode includes, for example, a two-dimensional mode for displaying a planar image and a three-dimensional mode for displaying a stereoscopic image. The global current management (GCM) of the two-dimensional mode may not be adequately applied to the three-dimensional mode in all circumstances, because of the specialty of the three-dimensional driving method. According to example embodiments, the GCM may be adaptively changed depending on the two-dimensional mode or the three-dimensional mode. Thus, power consumption may be reduced efficiently without degrading the quality of displayed image.

Figure 2:
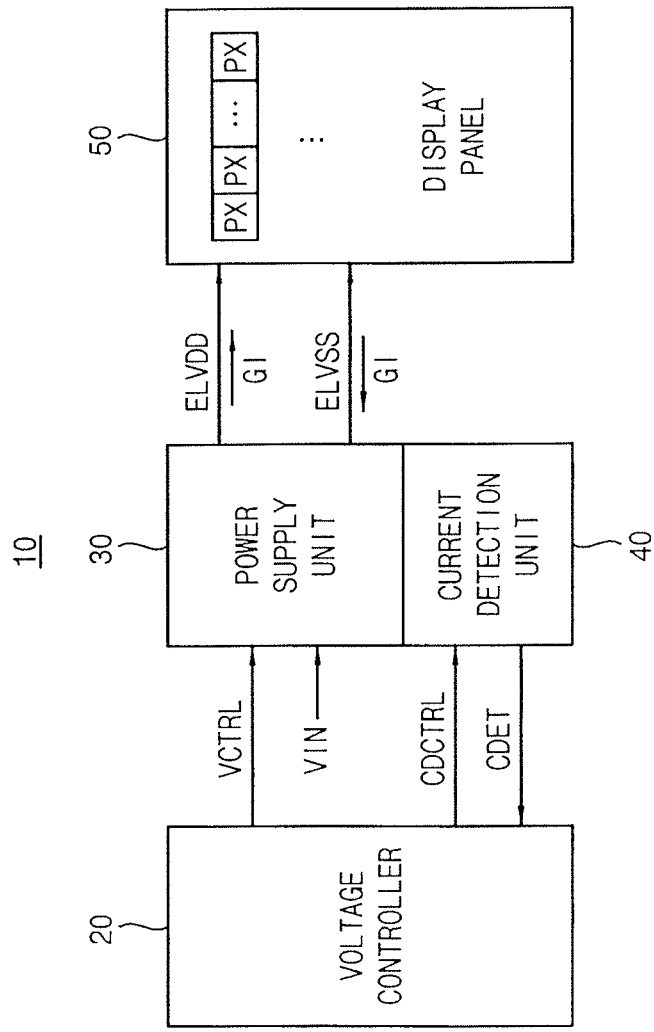
FIG. 2 illustrates an embodiment of an electroluminescent display device.
Figure 3:
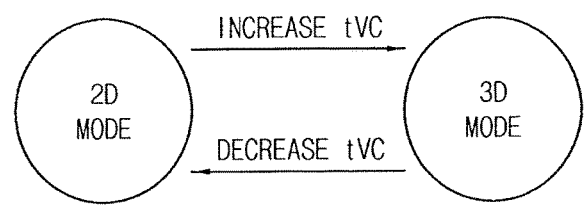
FIG. 3 illustrates an embodiment of an operation mode change.

FIG. 2 illustrates an embodiment of an electroluminescent display device 10, and FIG. 3 illustrates an embodiment of an operation mode change of the electroluminescent display device 10.

Referring to FIG. 2, the electroluminescent display device 10 includes a voltage controller 20, a power supply unit 30, a current detection unit 40, and a display panel 50. The current detection unit 40 may be in the power supply unit 30 or provided separately and coupled to the power supply unit 30.

The display panel 50 includes a plurality of pixels PX operating based on a high power supply voltage ELVDD and a low power supply voltage ELVSS.

The power supply unit 30 generates the high power supply voltage ELVDD and the low power supply voltage ELVSS based on an input voltage VIN and a voltage control signal VCTRL. The power supply unit 30 may include, for example, a boost converter for generating the high power supply voltage ELVDD and an inverting buck-boost converter for generating the low power supply voltage ELVSS. The input voltage VIN provided to the power supply unit 30 may an AC voltage or a DC voltage provided for example, from a battery or other power source. The voltage converters in the power supply unit 30 may be, for example, an AC-DC converter or a DC-DC converter.

The current detection unit 40 senses a global current GI provided to the display panel 50 based on a current detection control signal CDCTRL representing a voltage control period tVC. The current detection unit 40 generates a current detection signal CDET representing an average value of the global current GI per voltage control period tVC.

The voltage controller 20 generates the current detection control signal CDCTRL such that the voltage control period tVC is changed depending on operation mode, e.g., a two-dimensional mode for displaying a planar image or a three-dimensional mode for displaying a stereoscopic image. The voltage controller 20 provides the current detection control signal CDCTRL to the current detection unit 40. Also the voltage controller 20 generates the voltage control signal VCTRL based on the current detection signal CDET from the current detection unit 40, and provides the voltage control signal VCTRL to the power supply unit 30. The voltage controller 20 may adjust the voltage control signal VCTRL to control the voltage levels of the high power supply voltage ELVDD and/or the low power supply voltage ELVSS generated by the power supply unit 30.

The voltage controller 20 may change the voltage control period tVC according to the operation mode. The voltage control period tVC may correspond to a time period of updating the voltage levels of the power supply voltages ELVDD and ELVSS. Thus, the average value of the global current GI may be provided per voltage control period tVC from the current detection unit 40.

As illustrated in FIG. 3, the voltage control period tVC may be increased when the operation mode is changed from the two-dimensional mode to the three-dimensional mode. The voltage control period tVC may be decreased when the operation mode is changed from the three-dimensional mode to the two-dimensional mode. As will be described with reference to FIGS. 4 and 5, the voltage control period tVC may be represented by the transition timings of the current detection control signal CDCTRL. The voltage controller 20 may change the voltage control period tVC by changing the transition timings of the current detection control signal CDCTRL depending on the three-dimensional mode and two-dimensional mode.

Figure 4:
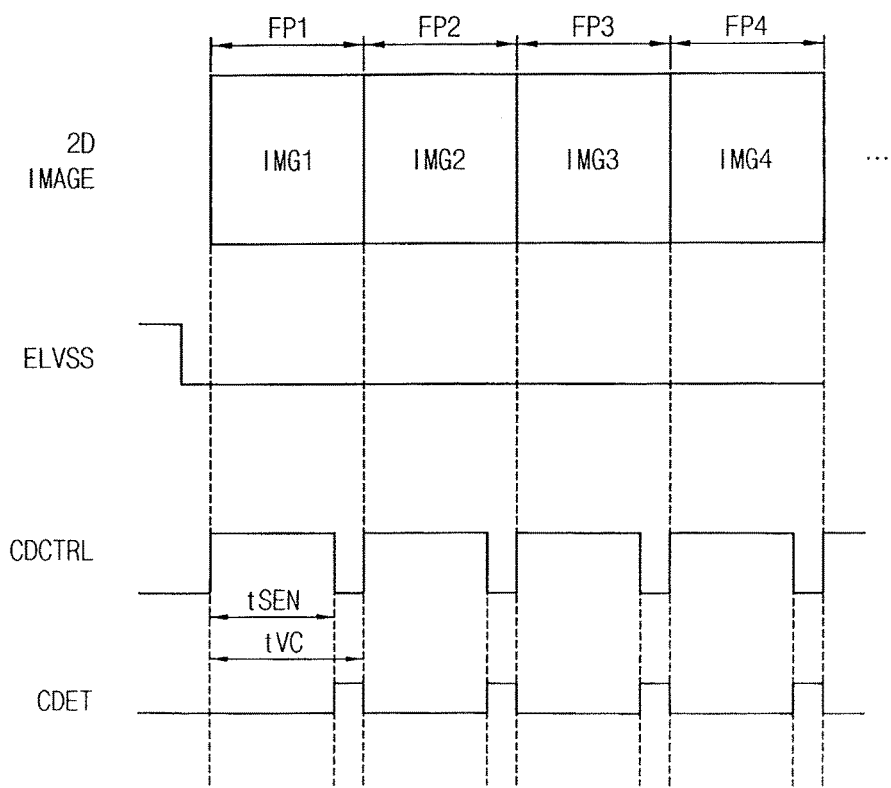
FIG. 4 illustrates an example of control signals for the electroluminescent display device in two-dimensional mode.

FIG. 4 illustrates an example of the operation of the electroluminescent display device in FIG. 2 in a two-dimensional mode. Referring to FIG. 4, one image may be displayed during one frame period. As illustrated in FIG. 4, a first image IMG1 may be displayed during a first frame period FP1, a second image IMG2 may be displayed during a second frame period FP2, a third image IMG3 may be displayed during a third frame period FP3, and a fourth image IMG4 may be displayed during a fourth frame period FP4.

The low power supply voltage ELVSS may be maintained in an activated state of a negative voltage level in the two-dimensional mode while the images IMG1~IMG4 are displayed. The voltage control period tVC of the two-dimensional mode may correspond to one frame period, and the current detection signal CDET may represent the average value of the global current GI per one frame period. The current detection signal CDET is illustrated in FIG. 4 as a pulse signal including one pulse per the voltage control signal tVC. In another embodiment, the current detection signal CDET may be, for example, a multi-bit signal representing a digital value corresponding to the average value of the global current GI per the voltage control period tVC.

The voltage control period NC may include a sensing time interval tSEN for sensing the global current GI. The sensing time interval tSEN may correspond to a high-level activation time interval of the current detection control signal CDCTRL. The current detection unit 40 in FIG. 2 may integrate the global current GI during the sensing time interval tSEN to obtain the average value of the global current GI.

For example, when displaying the two-dimensional images at 120 frames per second (fps), the voltage control period tVC or one frame period is 8.33 milli-seconds (ms) and the sensing time interval may be set to 8.22 ms. Most images between the frames have continuity in the two-dimensional mode, and the global current GI may be measured by setting the voltage control period tVC to one frame period.

Figure 5:
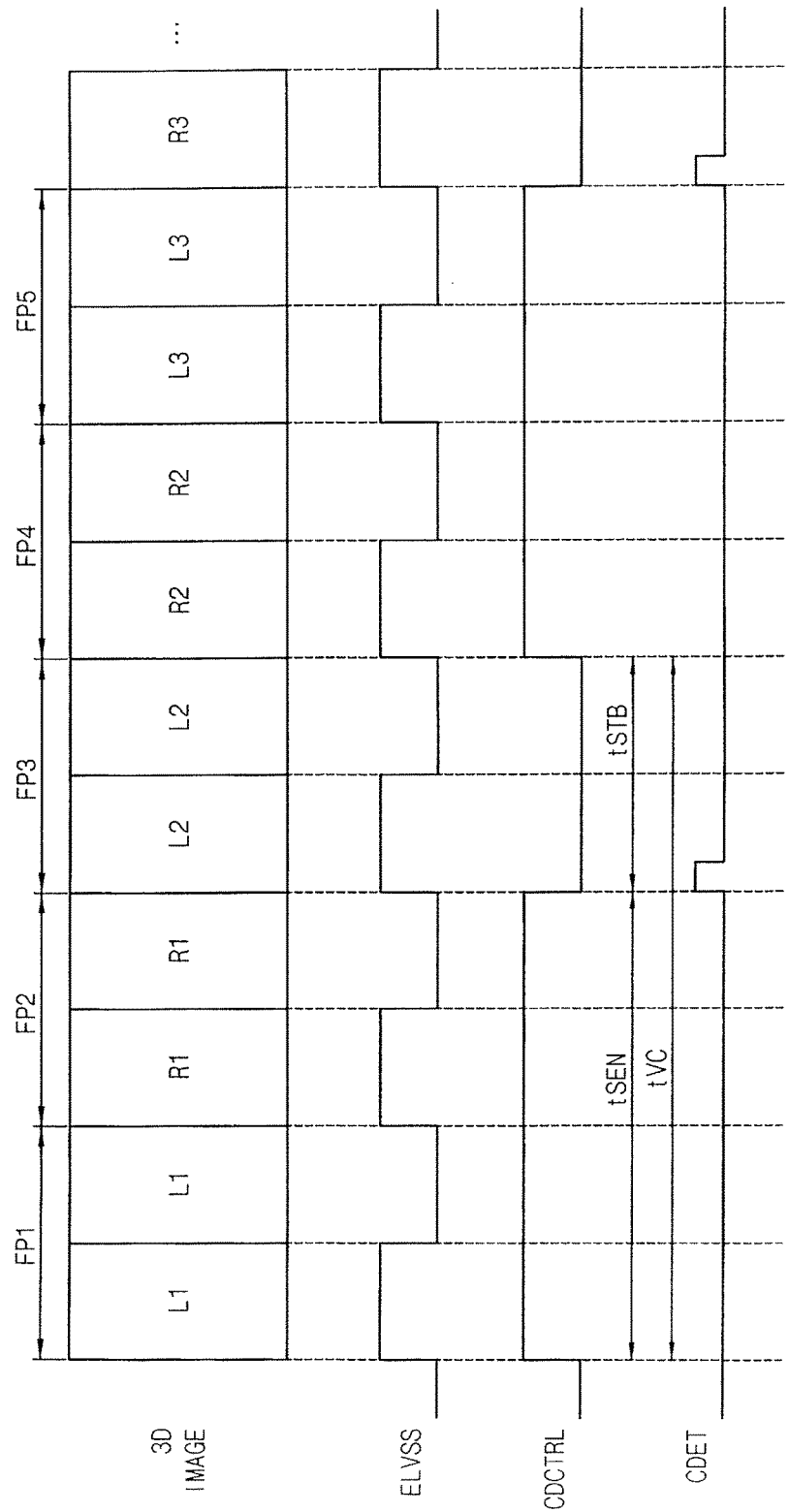
FIG. 5 illustrates an example of control signals for the electroluminescent display device in three-dimensional mode.

FIG. 5 illustrates an example of the operation of the electroluminescent display device in FIG. 2 in a three-dimensional mode. Referring to FIG. 5, the same image may be displayed twice during one frame period. As illustrated in FIG. 5, a first left-eye image L1 may be displayed twice during a first frame period FP1, a first right-eye image R1 may be displayed twice during a second frame period FP2, a second left-eye image L2 may be displayed twice during a third frame period FP3, a second right-eye image R2 may be displayed twice during a fourth frame period FP4, and so on.

The low power supply voltage ELVSS may be switched repeatedly between an activated state of a negative voltage level and a deactivated state of a ground voltage level in the three-dimensional mode while the images L1, R1, L2, R2 and so on are displayed.

The voltage control period tVC of the three-dimensional mode may include a sensing time interval tSEN for sensing the global current GI and a standby time interval tSTB after the sensing time interval tSEN. In the three-dimensional mode, the sensing time interval tSEN may correspond to a plurality of frame periods and the standby time interval tSTB may correspond to at least one frame period. For example, the sensing time interval tSEN may be set to 2N frame periods during which N left-eye images and N right-eye images are displayed. FIG. 5 illustrates that the sensing time interval tSEN corresponds to two frame periods during which one left-eye image L1 and one right-eye image R1 are displayed. The current detection unit 40 in FIG. 2 may integrate the global current GI during the sensing time interval tSEN to obtain the average value of the global current GI.

The current detection signal CDET may represent the average value of the global current GI per voltage control period tVC corresponding to a plurality of frame periods. The current detection signal CDET is illustrated in FIG. 5 as a pulse signal including one pulse per the voltage control signal tVC. In another embodiment, the current detection signal CDET may be, for example, a multi-bit signal representing a digital value corresponding to the average value of the global current GI per the voltage control period tVC.

Most images between the frames have continuity in the two-dimensional mode, and the global current GI may be measured by setting the voltage control period tVC to one frame period, as described with reference to FIG. 4. In case of the three-dimensional mode, however, it may be difficult to measure the global current GI due to specialty of the three-dimensional digital driving. For example, when the luminance between the left-eye images and the right-eye images is significant, fluctuation of the global current GI is increased and the display quality may be degraded if the driving voltage is controlled based on measurement of the global current GI as in the two-dimensional mode.

According to example embodiments, the average value of the global current GI over a plurality of frame periods is provided. As a result, power consumption may be reduced efficiently without degrading quality of displayed image.

Figure 6:
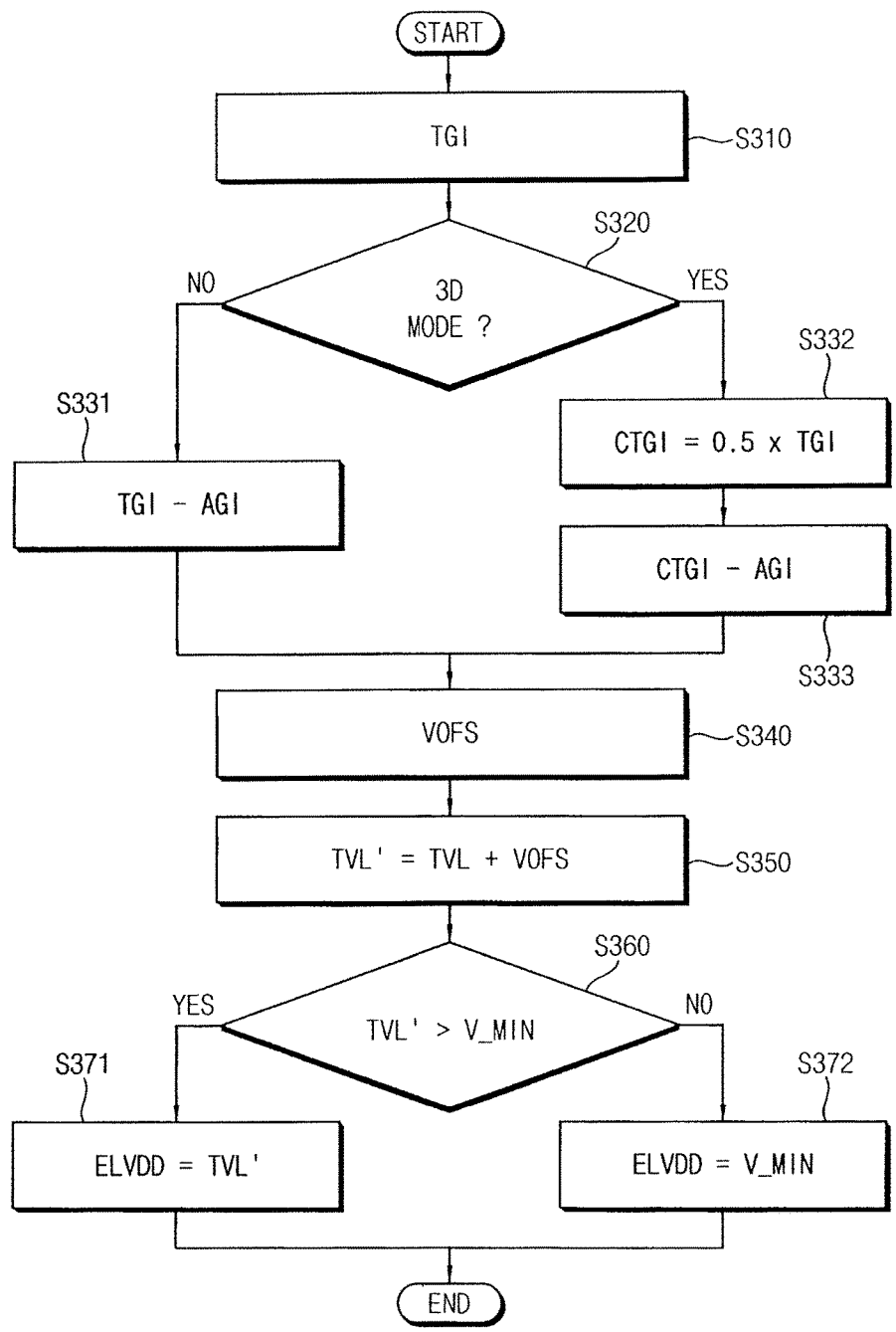
FIG. 6 illustrates an embodiment of a method for controlling a driving voltage.

FIG. 6 illustrating an embodiment of a method for controlling the driving voltage. Referring to FIGS. 2 and 6, the voltage controller 20 calculates a target value TGI of the global current GI based on input image data (S310). The voltage controller 20 increases the target value TGI as the average grayscale value of the input image data. The voltage controller 20 may calculate the target value TGI with respect to each of the images IMG1~IMG4 in FIG. 4 in the two-dimensional mode, and may update the target value TGI per one frame period corresponding to the voltage control period tVC.

In the three-dimensional mode, the voltage controller 20 calculates the target value TGI with respect to the N left-eye images and the N right-eye images during the sensing time interval tSEN in FIG. 5, and updates the target value TGI per a plurality of frame periods corresponding to the voltage control period tVC. The voltage controller 20 receives the average value AGI through the current detection signal CDET from the current detection unit 40 per voltage control period tVC depending on the operation mode.

When the present operation mode is the two-dimensional mode (S320: NO), the voltage controller 20 calculates a difference TGI-AGI between the target value TGI and the average value AGI (S331), and calculates a voltage offset VOFS based on the difference TGI-AGI between the target value TGI and the average value AGI (S340).

When the present operation mode is the three-dimensional mode (S320: YES), the voltage controller 20 calculates a compensated target value CTGI corresponding to a half of the target value TGI (S332). The voltage controller 20 may calculate a difference CTGI-AGI between the compensated target value CTGI and the average value AGI (S333), and calculate the voltage offset VOFS based on the difference CTGI-AGI between the compensated target value CTGI and the average value AGI (S340).

As a result, the target value TGI may be corrected to the compensated target value CTGI in the three-dimensional mode because of cathode switching performed in three-dimensional digital driving. One half of each frame period corresponds to an emission period, and the other half of each frame period corresponds to a non-emission period. As a result, the target value TGI or the measured average value AGI of the global current GI may be corrected.

The voltage controller 20 controls the voltage level of the high power supply voltage ELVDD based on the voltage offset VOFS. The voltage controller 20 calculates the next target level TVL' of the high power supply voltage ELVDD by adding the voltage offset VOFS to the previous target level TVL (S350). When the calculated voltage level TVL' for the next frame is greater than a predetermined minimum level V_MIN (S360: YES), the voltage controller 20 determines the calculated voltage level TVL' as the voltage level of the high power supply voltage ELVDD (S371). When the calculated voltage level TVL' for the next frame is not greater than the minimum level V_MIN (S360: NO), the voltage controller 20 determines the minimum level V_MIN as the voltage level of the high power supply voltage ELVDD (S372).

Figure 7:
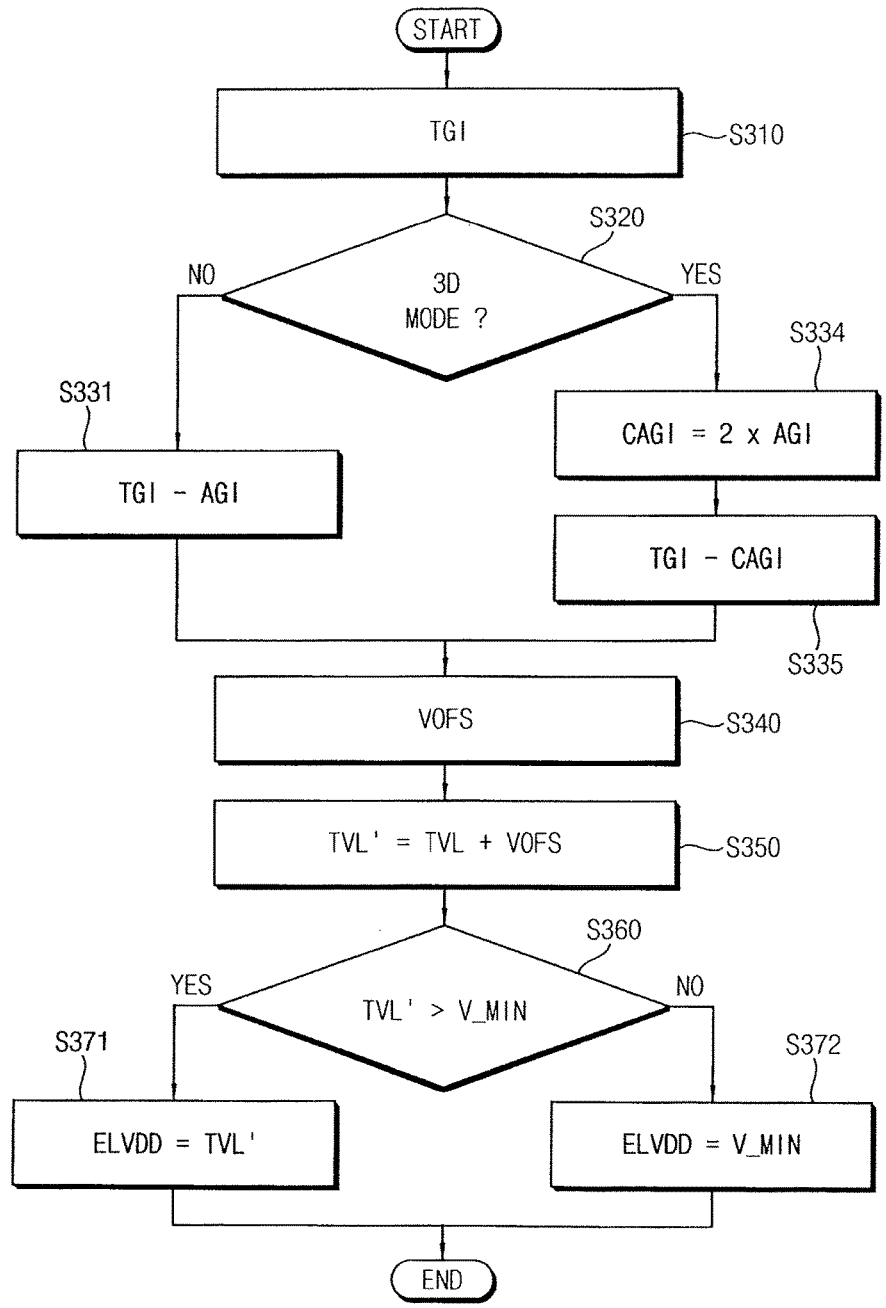
FIG. 7 illustrates another embodiment of a method for controlling a driving voltage.

FIG. 7 illustrates another embodiment of a method for controlling driving voltage. Referring to FIGS. 2 and 7, a voltage controller 20 calculates a target value TGI of the global current GI based on input image data (S310). The voltage controller 20 increases the target value TGI as the average grayscale value of the input image data. The voltage controller 20 may calculate the target value TGI with respect to each of the images IMG1~IMG4 in FIG. 4 in the two-dimensional mode, and may update the target value TGI per one frame period corresponding to the voltage control period tVC.

In the three-dimensional mode, the voltage controller 20 calculates the target value TGI with respect to the N left-eye images and the N right-eye images during the sensing time interval tSEN in FIG. 5, and updates the target value TGI per a plurality of frame periods corresponding to the voltage control period tVC. The voltage controller 20 receives the average value AGI through the current detection signal CDET from the current detection unit 40 per voltage control period tVC depending on the operation mode.

When the present operation mode is the two-dimensional mode (S320: NO), the voltage controller 20 calculates a difference TGI-AGI between the target value TGI and the average value AGI (S331), and calculates a voltage offset VOFS based on the difference TGI-AGI between the target value TGI and the average value AGI (S340).

When the present operation mode is the three-dimensional mode (S320: YES), the voltage controller 20 calculates a compensated average value CAGI corresponding to double the average value AGI (S334). The voltage controller 20 calculates a difference TGI-CAGI between the target value TGI and the compensated average value CAGI (S335), and calculates the voltage offset VOFS based on the difference TGI-CAGI between the target value TGI and the compensated average value CAGI (S340).

As such, the average value AGI may be corrected to the compensated average value CAGI in the three-dimensional mode because of cathode switching performed in the three-dimensional digital driving. One half of each frame period corresponds to an emission period, and the other half of each frame period corresponds to a non-emission period. Thus, the target value TGI or the measured average value AGI of the global current GI may be corrected.

The voltage controller 20 controls the voltage level of the high power supply voltage ELVDD based on the voltage offset VOFS. The voltage controller 20 calculates the next target level of the high power supply voltage ELVDD by adding the voltage offset VOFS to the previous target level TVL (S350). When the calculated voltage level TVL' for the next frame is greater than a predetermined minimum level V_MIN (S360: YES), the voltage controller 20 determines the calculated voltage level TVL' as the voltage level of the high power supply voltage ELVDD (S371). When the calculated voltage level TVL' of the high power supply voltage ELVDD for the next frame is not greater than the minimum level V_MIN (S360: NO), the voltage controller 20 determines the minimum level V_MIN as the voltage level of the high power supply voltage ELVDD for the next frame (S372).

Figure 8:
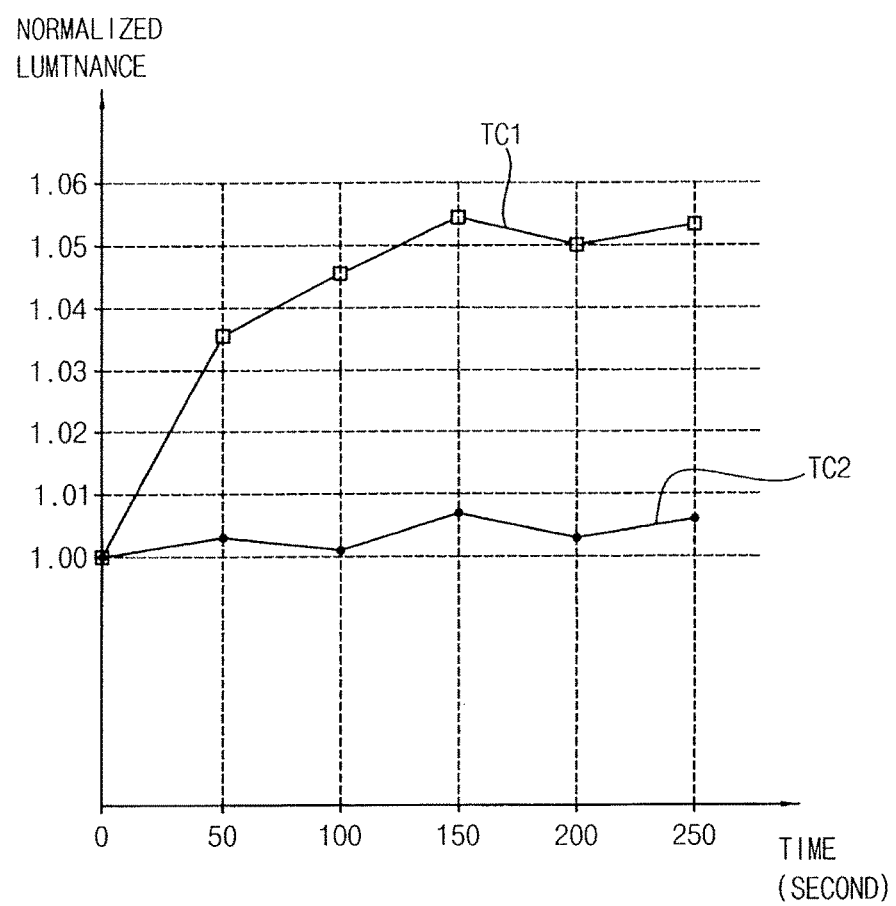
FIG. 8 illustrates an embodiment for performing luminance control of an electroluminescent display device.

FIG. 8 illustrating an embodiment for performing luminance control of an electroluminescent display device. In FIG. 8, the vertical axis represents normalized luminance of displayed stereoscopic images and the horizontal axis represents elapsed time, with an initial point corresponding to the start of displaying the stereoscopic images. The first trend line TC1 represents luminance change without performing global current management (GCM), and the second trend line TC2 represents the luminance change with performing the GCM.

When the GCM is not performed and the driving voltage is fixed, luminance increases gradually due to an increase in operational temperature and/or other factors, as represented by the first trend line TC1. As a result, power consumption unnecessarily increases. In contrast, when the GCM is performed according to one or more example embodiments, luminance may be maintained stably and power consumption may be managed efficiently.

Figure 9:
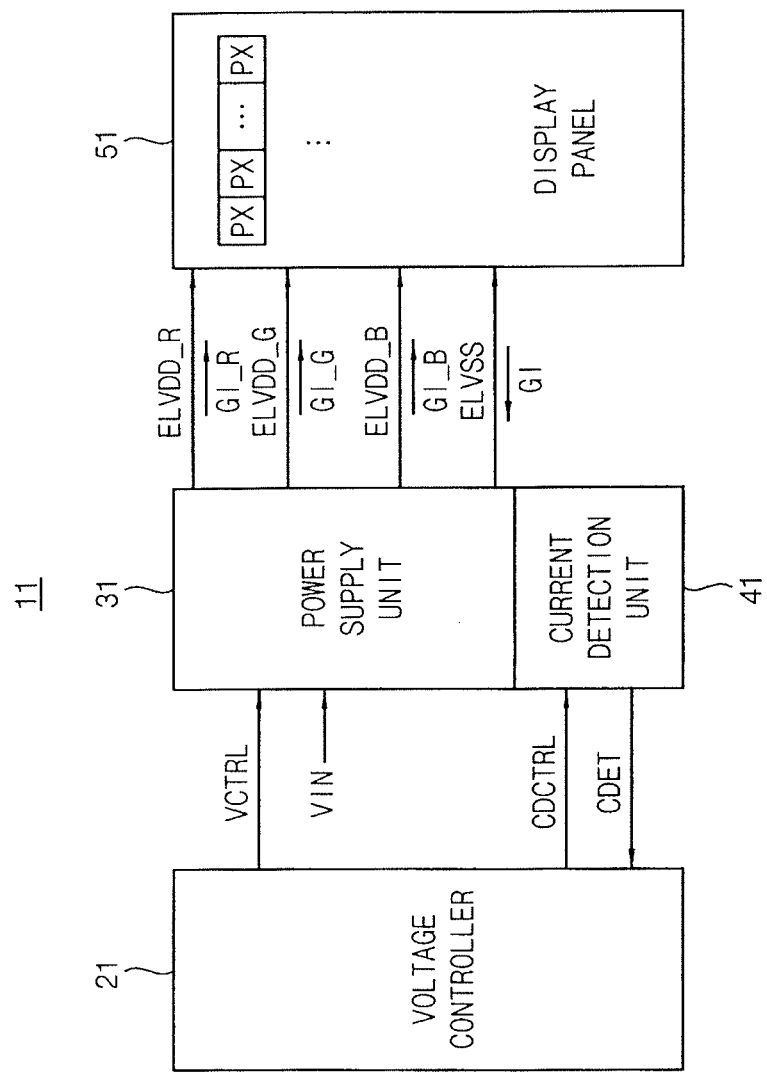
FIG. 9 illustrates another embodiment of an electroluminescent display device.

FIG. 9 illustrates another embodiment of an electroluminescent display device 11 which includes a voltage controller 21, a power supply unit 31, a current detection unit 41, and a display panel 51. The current detection unit 40 may be in the power supply unit 30 or provided separately and coupled to the power supply unit 30.

Referring to FIG. 9, the display panel 51 includes a plurality of pixels PX operating based on a first (e.g., high) power supply voltage ELVDD and a second (e.g., low) power supply voltage ELVSS. The high power supply voltage ELVDD may include a red high power supply voltage ELVDD_R, a green high power supply voltage ELVDD_G, and a blue high power supply voltage ELVDD_B.

The power supply unit 31 generates the red high power supply voltage ELVDD_R, the green high power supply voltage ELVDD_G, the blue high power supply voltage ELVDD_B, and the low power supply voltage ELVSS based on an input voltage VIN and a voltage control signal VCTRL. The power supply unit 31 may include, for example, boost converters for generating the red high power supply voltage ELVDD_R, the green high power supply voltage ELVDD_G, the blue high power supply voltage ELVDD_B and an inverting buck-boost converter for generating the low power supply voltage ELVSS. The input voltage VIN to the power supply unit 31 may be an AC voltage or a DC voltage, for example, from a battery or another power source. The voltage converters in the power supply unit 31 may be an AC-DC converter or a DC-DC converter.

The current detection unit 41 senses a red global current GI_R, a green global current GI_G, and a blue global current GI_B provided to the display panel 51 based on a current detection control signal CDCTRL representing a voltage control period tVC. The current detection unit 41 generates a current detection signal CDET representing average values of the red global current GI_R, the green global current GI_G, and the blue global current GI_B per voltage control period tVC. The sum of the red global current GI_R, the green global current GI_G, and the blue global current GI_B may be substantially the same as the global current GI.

The voltage controller 21 generates the current detection control signal CDCTRL such that the voltage control period tVC is changed depending on the operation mode. The operation mode may be, for example, a two-dimensional mode for displaying a planar image or a three-dimensional mode for displaying a stereoscopic image. The voltage controller 21 provides the current detection control signal CDCTRL to the current detection unit 41.

Also the voltage controller 21 generates the voltage control signal VCTRL based on the current detection signal CDET from the current detection unit 41, and provides the voltage control signal VCTRL to the power supply unit 31. The voltage controller 21 adjusts the voltage control signal VCTRL to control the voltage levels of the high power supply voltages ELVDD_R, ELVDD_G, and ELVDD_B and/or the low power supply voltage ELVSS generated by the power supply unit 31.

The voltage controller 21 changes the voltage control period tVC according to the operation mode. The voltage control period tVC may correspond to a time period of updating the voltage levels of the power supply voltages ELVDD_R, ELVDD_G, ELVDD_B, and ELVSS. Thus, the average value of the global currents GI_R, GI_G, and GI_B may be provided per voltage control period tVC from the current detection unit 41.

As illustrated in FIG. 3, the voltage control period tVC may be increased when the operation mode is changed from the two-dimensional mode to the three-dimensional mode. The voltage control period tVC may be decreased when the operation mode is changed from the three-dimensional mode to the two-dimensional mode.

As described with reference to FIGS. 4 and 5, the voltage control period tVC may be represented by the transition timings of the current detection control signal CDCTRL. The voltage controller 20 may change the voltage control period tVC by changing the transition timings of the current detection control signal CDCTRL depending on the three-dimensional mode or two-dimensional mode.

Figure 10:
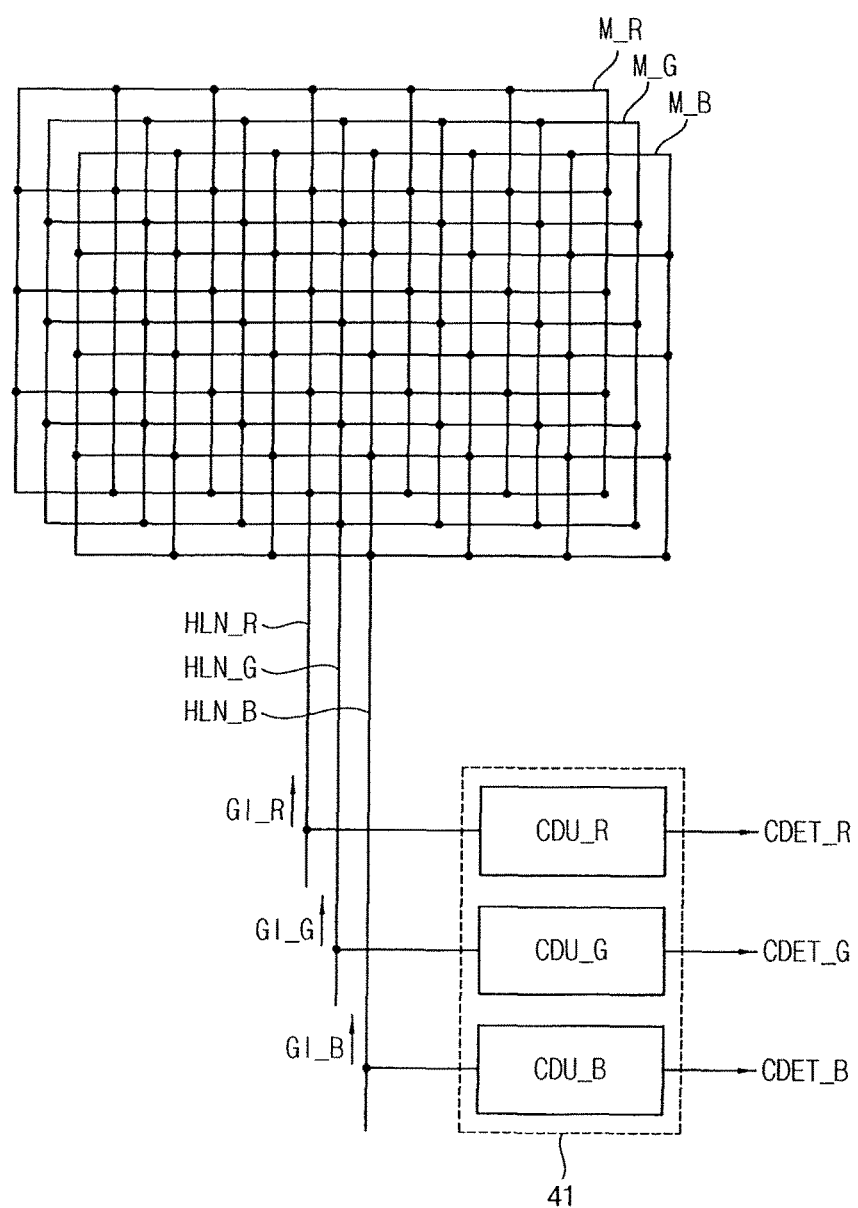
FIG. 10 illustrates an example of wiring for a high power supply voltage and a current detection unit in the electroluminescent display device of FIG. 9.

FIG. 10 illustrates an example of wiring for a high power supply voltage and a current detection unit in the electroluminescent display device of FIG. 9. Referring to FIG. 10, red high power supply voltage wiring M_R, green high power supply voltage wiring M_G, and blue high power supply voltage wiring M_B may be formed in the display panel. The red high power supply voltage wiring M_R provides a path for providing red high power supply voltage ELVDD_R to the red pixels. The green high power supply voltage wiring M_G provides a path for providing green high power supply voltage ELVDD_G to the green pixels. The blue high power supply voltage wiring M_B provides a path for providing blue high power supply voltage ELVDD_B to the blue pixels.

In FIG. 10, the wirings M_R, M_G, and M_B are illustratively shown in a mesh structure to uniformly provide the high power supply voltages ELVDD_R, ELVDD_G, and ELVDD_B to the pixel distributed in the display panel. However, the wirings M_R, M_G, and M_B may have a different arrangement in another embodiment.

Referring to FIGS. 9 and 10, the current detection unit 41 includes a red current detection unit CDU_R, a green current detection unit CDU_G, and a blue current detection unit CDU_B. The red current detection unit CDU_R generates a red current detection signal CDET_R, representing an average value of the red global current GI_R per voltage control period tVC, by sensing the red global current GI_R provided to the red pixels in the display panel. The green current detection unit CDU_G generates a green current detection signal CDET_G, representing an average value of a green global current GI_G per voltage control period tVC, by sensing the green global current GI_G provided to the green pixels in the display panel. The blue current detection unit CDU_B generates a blue current detection signal CDET_B, representing an average value of a blue global current GI_B per voltage control period tVC, by sensing the blue global current GI_B provided to the blue pixels in the display panel.

The red global current GI_R may correspond to the sum of the driving currents of the red pixels. The current on a red voltage line HLV_R, connecting the red high power supply voltage wiring M_R and the power supply unit 31 of FIG. 9, may be measured as the red global current GI_R. The green global current GIG may correspond to the sum of the driving currents of the green pixels. The current on a green voltage line HLV_G, connecting the green high power supply voltage wiring M_G and the power supply unit 31 of FIG. 9, may be measured as the green global current GI_G. The blue global current GI_B may correspond to the sum of the driving currents of the blue pixels. The current on a blue voltage line HLV_B, connecting the blue high power supply voltage wiring M_B and the power supply unit 31 of FIG. 9, may be measured as the blue global current GI_B.

The voltage controller 21 controls the red high power supply voltage ELVDD_R provided to the red pixels based on the red current detection signal CDET_R, controls the green high power supply voltage ELVDD_G provided to the green pixels based on the green current detection signal CDET_G, and controls the blue high power supply voltage ELVDD_B provided to the blue pixels based on the blue current detection signal CDET_B. As such, the high power supply voltage ELVDD may be controlled independently for each of the red pixels, the green pixels, and the blue pixels.

The current detection unit 41 generates the current detection signals CDET_R, CDET_G, and CDET_B independently for each of the red pixels, the green pixels, and the blue pixels. The voltage controller 21 controls the high power supply voltages ELVDD_R, ELVDD_G, and ELVDD_B independently per color based on the current detection signals CDET_R, CDET_G, and CDET_B.

Figure 11:
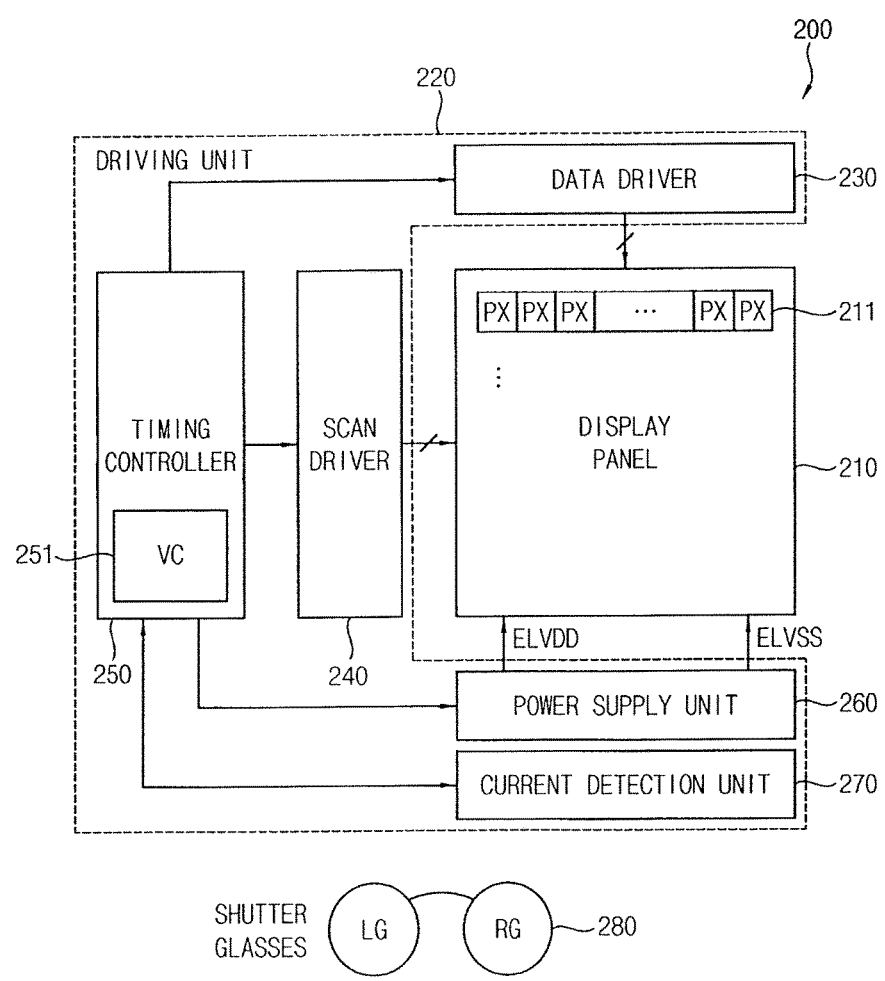
FIG. 11 illustrates another embodiment of an electroluminescent display device.
Figure 12:
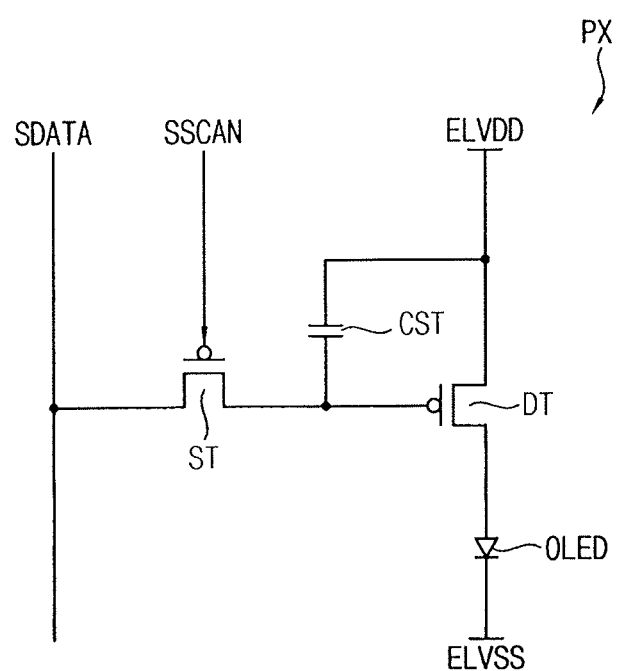
FIG. 12 illustrates an embodiment of a pixel.
Figure 13:
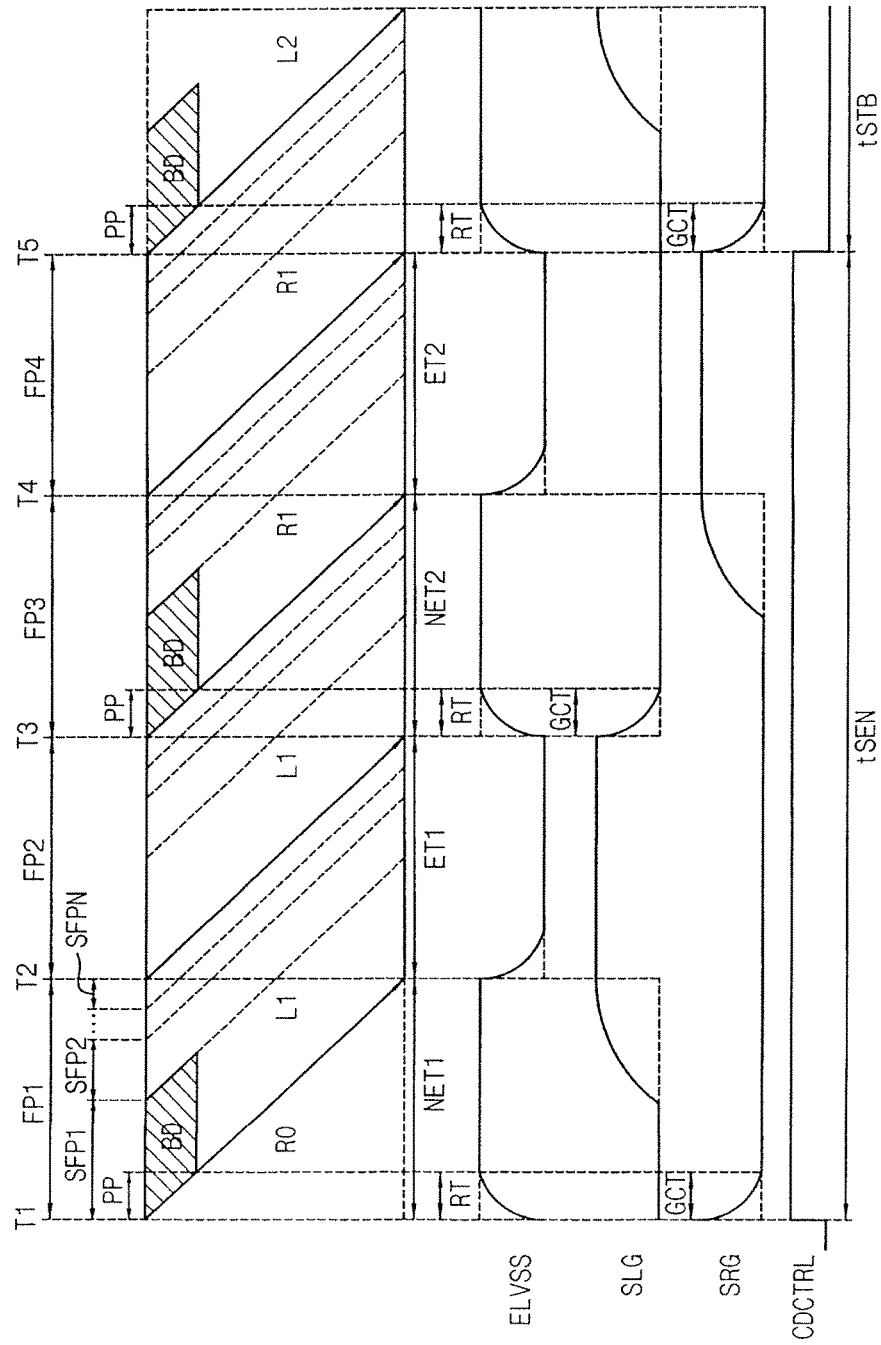
FIG. 13 illustrates an example of control signals for the electroluminescent display device in FIG. 11.
Figure 14:
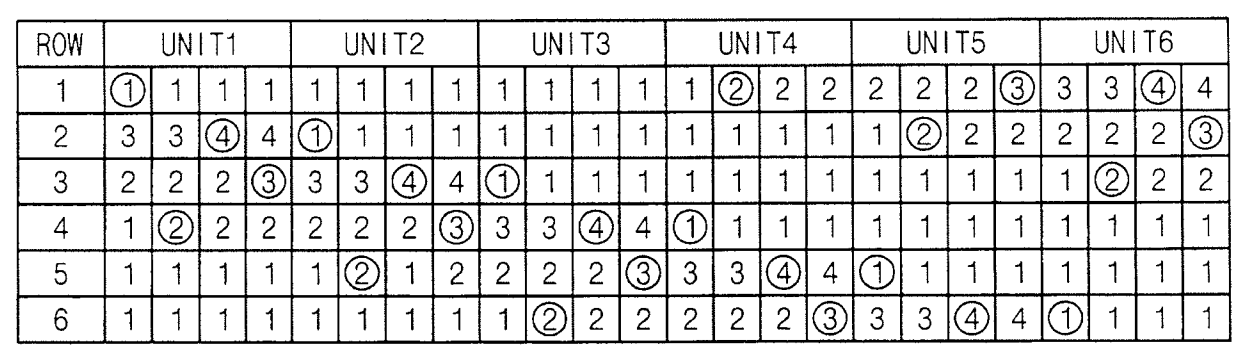

FIG. 11 illustrates another embodiment of an electroluminescent display device 200, FIG. 12 illustrates an embodiment of a pixel in the electroluminescent display device of FIG. 11, FIG. 13 is a timing diagram illustrating an example of control signals for the electroluminescent display device of FIG. 11, and FIG. 14 illustrates an embodiment of a method for writing data to pixel rows in the electroluminescent display device.

Referring to FIG. 11, the display device 200 includes a display panel 210 including a plurality of pixel rows 211 and a driving unit 220 that drives the display panel 210. The driving unit 220 includes a data driver 230, a scan driver 240, a timing controller 250, a power supply unit 260, a current detection unit 270, and a voltage controller VC 251. The display device 200 may operate in a three-dimensional mode (or a stereoscopic mode) or a two-dimensional mode. In the three-dimensional mode, the display device 200 may operate in synchronization with shutter glasses 280.

The display panel 210 is connected to the data driver 230 of the driving unit 220 through a plurality of data lines and is connected to the scan driver 240 of the driving unit 220 through a plurality of scan lines. The display panel 210 includes the pixel rows 211. For example, the display panel 210 includes a plurality of pixels PX arranged in a matrix having a plurality of rows and a plurality of columns. One row of pixels PX connected to the same scan line may be referred to as one pixel row 211. In some example embodiments, the display panel 210 may be a self-emitting display panel that emits light without the use of a backlight unit. For example, the display panel 210 may be an organic light-emitting diode (OLED) display panel.

As illustrated in FIG. 12, each pixel PX of the display panel 210 includes a switching transistor ST, a storage capacitor CST, a driving transistor DT, and an OLED. The switching transistor ST has a first source/drain terminal connected to a data line, a second source/drain terminal connected to the storage capacitor CST, and a gate terminal connected to the scan line. The switching transistor ST transfers a data signal SDATA received from the data driver 230 to the storage capacitor CST based on a scan signal SSCAN from the scan driver 240. The storage capacitor CST stores the data signal SDATA transferred through the switching transistor ST. The driving transistor DT has a first source/drain terminal connected to a high power supply voltage ELVDD, a second source/drain terminal connected to the OLED, and a gate terminal connected to the storage capacitor CST. The driving transistor DT is turned on or off according to the data signal SDATA stored in the storage capacitor CST.

The OLED has an anode electrode connected to the driving transistor DT and a cathode electrode connected to a low power supply voltage ELVSS. The OLED emits light based on a current flowing from the high power supply voltage ELVDD to the low power supply voltage ELVSS while the driving transistor DT is turned on. The structure of each pixel PX has a 2T1C structure including two transistors ST and DT and one capacitor CST. Such a pixel structure is suitable for a large-sized display device.

The data driver 230 applies data signals (e.g., a signal corresponding to left-eye image data, a signal corresponding to right-eye image data, or a signal corresponding to black data) to the display panel 210 through the data lines. The scan driver 240 applies a scan signal to the display panel 210 through the scan lines. As described above, the voltage controller 251 generates the current detection control signal CDCTRL such that the voltage control period tVC may be changed depending on the operation mode, e.g., two-dimensional mode for displaying the planar image or the three-dimensional mode for displaying the stereoscopic image. The voltage controller 251 generates the voltage control signal VCTRL based on the current detection signal CDET.

The timing controller 250 controls operation of the display device 200. As illustrated in FIG. 11, the voltage controller 251 may be included in the timing controller 250. For example, the timing controller 250 may provide predetermined control signals to the data driver 230 and the scan driver 240 to control the operations of the display device 200. In some example embodiments, the data driver 230, the scan driver 240, and the timing controller 250 may be implemented as one integrated circuit (IC). In other example embodiments, the data driver 230, the scan driver 240, and the timing controller 250 may be implemented in two or more integrated circuits.

The power supply unit 260 may supply the display panel 210 with a first power supply voltage (e.g., the high power supply voltage ELVDD) and a second power supply voltage (e.g., the low power supply voltage ELVSS). In some example embodiments, the power supply unit 260 may control the emission or non-emission of the display panel 210 by adjusting at least one of the high power supply voltage ELVDD or the low power supply voltage ELVSS. The power supply unit 260 may provide the pixel rows 211 with the high and low power supply voltages ELVDD and ELVSS having a first voltage difference such that the pixel rows 211 do not emit light during a non-emission period. The power supply unit 260 may provide the pixel rows 211 with the high and low power supply voltages ELVDD and ELVSS having a second voltage difference greater than the first voltage difference to induce the pixel rows 211 to emit light during an emission period. For example, the first voltage difference may be about 0V and the second voltage difference may be a large enough voltage difference enough to enable the OLED to emit light.

The current detection unit 270, as described above, may generate the current detection signal CDET, representing the average value of the global current GI per voltage control period tVC, by sensing the global current GI provided to the display panel 210 based on the current detection control signal CDCTRL representing the voltage control period tVC.

FIGS. 13 and 14 illustrate an embodiment of a method for displaying a stereoscopic image at the display panel 200. Referring to FIGS. 11 and 13, the driving unit 220 sequentially writes black data BD to a portion of the pixel rows 211 during a portion PP of a first frame period FP1. In some example embodiments, the driving unit 220 may drive the display panel 210 by dividing one frame period (e.g., FP1) into a plurality of sub-frame periods SFP1, SFP2, and SFPN, and sequentially writes the black data BD to the portion of the pixel rows 211 during a portion PP of a first sub-frame period SFP1 of the first frame period FP1.

Since the black data BD are written to the portion of the pixel rows 211 during the portion PP of the first sub-frame period SFP1, while display of a right-eye image is terminated after the right-eye image is displayed based on the previous right-eye image data R0 displayed during a previous frame period, a left-eye image corresponding to left-eye image data L1 may be prevented from being displayed. Thus, crosstalk between the left-eye image and the right-eye image at an emission end time point may be prevented.

In some example embodiments, to prevent crosstalk at the emission end time point, the portion PP of the first sub-frame period SFP1 during which the black data BD are written may correspond to an emission end delay period, e.g., a rising time RT of the low power supply voltage ELVSS. In other example embodiments, to prevent crosstalk at the emission end time point, the portion PP of the first sub-frame period SFP1 during which the black data BD are written may correspond to a glass close time or lens close period GCT, e.g., a period during which a left-eye lens LG or a right-eye lens RG of the shutter glasses 280 switches from an open state to a closed state.

The driving unit 220 sequentially writes left-eye image data L1 to the pixel rows 211 during the remaining portion of the first frame period FP1. For example, the driving unit 220 sequentially writes the left-eye image data L1 to the remaining portion of the pixel rows 211 (other than the portion of the pixel rows 211 to which the black data BD are written) during the remaining portion of the first sub-frame period SFP1 of the first frame period FP1 (other than the portion PP of the first sub-frame period SFP1 of the first frame period FP1). Further, the driving unit 220 sequentially writes the left-eye image data L1 to the pixel rows 211 during the respective second through N-th sub-frame periods SFP2 and SFPN of the first frame period FP1, where N is an integer greater than one.

During a first non-emission time or a first non-emission period NET1 corresponding to the first frame period FP1, the driving unit 220 applies the first power supply voltage (e.g., the high power supply voltage ELVDD) and the second power supply voltage (e.g., the low power supply voltage ELVSS) having the first voltage difference such that the pixel rows 211 do not emit light. Here, a frame period may be shifted (e.g., by one unit time in a PESS method) according to the pixel rows 211.

For example, the first frame period FP1 may be a time period from a first time point T1 to a second time point T2 with respect to a pixel row (e.g., the top pixel row) to which a data write operation or a scan operation is performed first. The first frame period FP1 may also be a time period from the second time point T2 (or a time point near the second time point T2) to a third time point T3 (or a time point near the third time point T3) with respect to a pixel row (e.g., the bottom pixel row) to which the data write operation or the scan operation is performed last.

The non-emission time corresponding to a frame period may represent a time period corresponding to the frame period of the pixel row (e.g., the top pixel row) to which the data write operation or the scan operation is performed first. For example, the first non-emission time NET1 corresponding to the first frame period FP1 may be the time period from the first time point T1 to the second time point T2.

To control simultaneous emission/non-emission of the pixel rows 211, the driving unit 220 adjusts the voltage level of at least one of the high power supply voltage ELVDD or the low power supply voltage ELVSS. In some example embodiments, the driving unit 220 increases the low power supply voltage ELVSS to a high voltage level at the start time point of the first non-emission time NET1 so that the pixel rows 211 do not emit light. For example, the driving unit 220 may apply the low power supply voltage ELVSS having the high voltage level simultaneously to the pixel rows 211 during the first non-emission time NET1 corresponding to the first frame period FP1. In other example embodiments, the driving unit 220 decreases the high power supply voltage ELVDD to a low voltage level at the start time point of the first non-emission time NET1 so that the pixel rows 211 do not emit light.

The driving unit 220 may sequentially write the left-eye image data L1 to the pixel rows 211 during a second frame period FP2 after the first time period FP1. For example, the driving unit 220 may sequentially write the left-eye image data L1 to the pixel rows 211 during respective first through N-th sub-frame periods SFP1, SFP2, and SFPN of the second frame period FP2. For example, the driving unit 220 may overwrite the same image data or the same left-eye image data L1 to the pixel rows 211 for the two consecutive frame periods (e.g., the first and second frame periods FP1 and FP2).

During a first emission time ET1 corresponding to the second frame period FP2, the driving unit 220 may apply the first power supply voltage and the second power supply voltage having the second voltage difference so that the pixel rows 211 simultaneously emit light. In one embodiment, an emission period corresponding to a frame period may be a time period corresponding to the frame period of the pixel row (e.g., the top pixel row) to which the data write operation or the scan operation is first performed. For example, the first emission time or emission period ET1 corresponding to the second frame period FP2 may be the time period from the second time point T2 to the third time point T3.

In some example embodiments, the driving unit 220 may decrease the low power supply voltage ELVSS to a low voltage level at a start time point of the emission time ET1 so that the pixel rows 211 simultaneously emit light. For example, the driving unit 220 may apply the low power supply voltage ELVSS having the low voltage level simultaneously to the pixel rows 211 during the first emission time ET1 corresponding to the second frame period FP2. In other example embodiments, the driving unit 220 may increase the high power supply voltage ELVDD to a high voltage level at the start time point of the first emission time ET1 so that the pixel rows 211 simultaneously emit light.

While the display panel 210 displays the left-eye image based on the left-eye image data L1, the display device 200 (or an electronic device including the display device 200) may provide a left-eye lens control signal having a first logic level to the shutter glasses 280, such that the left-eye lens LG of the shutter glasses 280 is in an open state during the first emission time ET1.

According to example embodiments, the display device 200 or the electronic device communicates, via a wired or wireless connection, with the shutter glasses 280 to provide the left-eye lens control signal. To ensure that the left-eye lens LG of the shutter glasses 280 is the an open state at a start time point of the first emission time ET1, or at the second time point T2, the left-eye lens control signal having the first logic level may be transferred to the shutter glasses 280 before the second time point T2. Accordingly, during the first emission time ET1, the display panel 210 may display the left-eye image based on the left-eye image data L1 and the left-eye lens LG of the shutter glasses 280 may be open, thereby providing the left-eye image to the left-eye of a user.

The driving unit 220 may sequentially write the black data BD to the portion of the pixel rows 211 during a portion PP of a first sub-frame period SFP1 of a third frame period FP3. The driving unit 220 may sequentially write right-eye image data R1 to the remaining portion of the pixel rows 211 during the remaining portion of the first sub-frame period SFP1 of the third frame period FP3. The driving unit 220 may also sequentially write the right-eye image data R1 to the pixel rows 211 during respective second through N-th sub-frame periods SFP2 and SFPN of the third frame period FP3.

Further, during a second non-emission time NET2 (e.g., a time period from the third time point T3 to a fourth time point T4) corresponding to the third frame period FP3, the driving unit 220 may apply the high and low power supply voltages ELVDD and ELVSS having the first voltage difference so that the pixel rows 211 do not emit light. Since the black data BD are written to the portion of the pixel rows 211 during the portion PP of the first sub-frame period SFP1, while the display of the left-eye image is terminated after the left-eye image has been displayed based on previous left-eye image data L1 during the previous frame period (e.g., the second frame period FP2), a right-eye image corresponding to the right-eye image data R1 may be prevented from being displayed. Thus, crosstalk between the left-eye image and the right-eye image at an emission end time point may be reduced or prevented.

In some example embodiments, to prevent crosstalk at the emission end time point, the portion PP of the first sub-frame period SFP1 during which the black data BD are written may correspond to an emission end delay period. For example, as illustrated in FIG. 13, to control the display panel 210 to not emit light, the driving unit 220 may increase the low power supply voltage ELVSS to the high voltage level at the third time point T3, e.g., an end time point of the first emission time ET1 or a start time point of the second non-emission time point NET2. The voltage level increase of the low power supply voltage ELVSS may be delayed by a rising time of the low power supply voltage ELVSS from the low voltage level to the high voltage level. Thus, termination of the emission of the display panel 210 may be delayed by the rising time of the low power supply voltage ELVSS.

Further, although the display device 200 or the electronic device provides the left-eye lens control signal having a second logic level to the shutter glasses 280 at the third time point T3 so that the left-eye lens LG of the shutter glasses 280 switches to a closed state, the switch in states of the left-eye lens LG may be delayed by the glass close time GCT (e.g., a period during which the left-eye lens LG switches from the open state to the closed state). Thus, in the standard display, the right-eye image data R1 may be written to the display panel 210 during the emission end delay period or the rising time of the low power supply voltage ELVSS.

However, in the display device 200, the black data BD may be written to the portion of the pixel rows 211 during the portion PP of the third frame period FP3 corresponding to the rising time of the low power supply voltage ELVSS, thereby preventing the right-eye image from being provided to the user through the left-eye lens LG of the shutter glasses 280.

In other example embodiments, to control the display panel 210 to not emit light, the driving unit 220 may decrease the high power supply voltage ELVDD to the low voltage level at the third time point T3. In this case, the portion PP of the third frame period FP3 may correspond to a falling time during which the high power supply voltage ELVDD falls from the high voltage level to the low voltage level. In still other example embodiments, the portion PP of the third frame period FP3 may correspond to the glass close time GCT of the left-eye lens LG or the right-eye lens RG of shutter glasses 280.

The driving unit 220 may sequentially write the right-eye image data R1 to the pixel rows 211 during respective first through N-th sub-frame periods SFP1, SFP2, and SFPN of a fourth frame period FP4. During a second emission time ET2 (e.g., a time period from the fourth time point T4 to a fifth time point T5) corresponding to the fourth frame period FP4, the driving unit 220 may apply the low power supply voltage ELVSS having the low voltage level simultaneously to the pixel rows 211 so that the pixel rows 211 simultaneously emit light.

Further, while the display panel 210 displays the right-eye image based on the right-eye image data R1, the display device 200 or the electronic device may provide a right-eye lens control signal having the first logic level to the shutter glasses 280, so that the right-eye lens RG of the shutter glasses 280 is in the open state during the second emission time ET2. Accordingly, during the second emission time ET2, the display panel 210 may display the right-eye image based on the right-eye image data R1 and the right-eye lens RG of the shutter glasses 280 may be open, thereby providing the right-eye image to the right-eye of the user.

Subsequently, although the voltage level increase of the low power supply voltage ELVSS is delayed and the change in state of the right-eye lens RG is delayed at a start time point of the next frame period, the black data BD may be written to the portion of the pixel rows 211 during a portion PP of the next frame period. Thus, a left-eye image corresponding to the next left-eye image data L2 being provided through the right-eye lens RG may be reduced or prevented.

In some example embodiments, the black data BD and the left-eye image data L1 at the first frame period FP1, the left-eye image data L1 at the second frame period FP2, the black data BD and the right-eye image data R1 at the third frame period FP3, and the right-eye image data R1 at the fourth frame period FP3 may be written in a progressive emission with simultaneous scan (PESS) method.

For example, in the display device 200, as illustrated in FIG. 14, a time period corresponding to one frame period may be divided into a plurality of unit times UNIT1, UNIT2, UNIT3, UNIT4, UNIT5, and UNIT6 according to the vertical resolution of the display panel 210. Thus, the number of unit times UNIT1, UNIT2, UNIT3, UNIT4, UNIT5, and UNIT6 corresponding to one frame period may be the number of scan lines in the display panel 210 or the number of the pixel rows 211.

Further, each unit time UNIT1, UNIT2, UNIT3, UNIT4, UNIT5 and UNIT6 may be divided into a plurality of partial times or sub-unit times. The number of the partial times in one unit time may be the number of the sub-frame periods SFP1, SFP2, and SFPN in one frame period.

FIG. 14 illustrates an example where a display panel includes 6 pixel rows and one frame includes 4 sub-frames. Accordingly, in FIG. 14, the time period corresponding to one frame period may be divided into 6 unit times UNIT1, UNIT2, UNIT3, UNIT4, UNIT5, and UNIT6. Each unit time UNIT1, UNIT2, UNIT3, UNIT4, UNIT5, and UNIT6 may be divided into 4 partial times. In this embodiment, data corresponding to different sub-frames may be written to different pixel rows at the partial times of each unit time UNIT1, UNIT2, UNIT3, UNIT4, UNIT5, and UNIT6, respectively. Data corresponding to each sub-frame may be sequentially written to the 6 pixel rows while being delayed by one unit time with respect to the respective pixel rows. In this PESS method, since the respective data write times for all pixel rows are distributed throughout a time period corresponding to one frame period, each data write time may be sufficiently obtained. Accordingly, the PESS method may be suitable for large-sized display devices having high resolution.

In the standard display device (e.g., a large sized display device) that performs the data write operation in the progressive emission with simultaneous scan (PESS) method, crosstalk between a left-eye image and a right-eye image may occur when the display device displays a stereoscopic image. However, as described above, in the display device 200, the same image data may be overwritten during two respective consecutive frame periods, and all pixel rows included in the display panel 210 may simultaneously emit light during the emission period corresponding to the second one of the two consecutive frame periods. As a result, crosstalk may be reduced or prevented between the left-eye image and the right-eye image.

Further, in the display device 200, since the black data may be written to the portion of the pixel rows during a portion of the first one of the two consecutive frame periods, crosstalk between the left-eye image and the right-eye image at the emission end time point or at the glass close time point may be substantially completely removed.

According to example embodiments, the voltage control period tVC of the three-dimensional mode may include a sensing time interval tSEN for sensing the global current GI and a standby time interval tSTB after the sensing time interval tSEN. In the three-dimensional mode, the sensing time interval tSEN may correspond to a plurality of frame periods and the standby time interval tSTB may correspond to at least one frame period. The voltage controller 251 may generate the current detection control signal CDCTRL such that the activation level corresponds to the sensing time interval tSEN and the deactivation level corresponds to the standby time interval tSTB.

As described above, the voltage controller 251 may increase the voltage control period tVC when the operation mode is changed from the two-dimensional mode to the three-dimensional mode, and may decrease the voltage control period tVC when the operation mode is changed from the three-dimensional mode to the two-dimensional mode. As such, the global current management (GCM) may be performed adaptively depending on the two-dimensional mode or the three-dimensional mode. Thus, power consumption may be reduced efficiently without degrading the quality of displayed images when the operation mode is changed between the two-dimensional mode and the three-dimensional mode.

Figure 15:
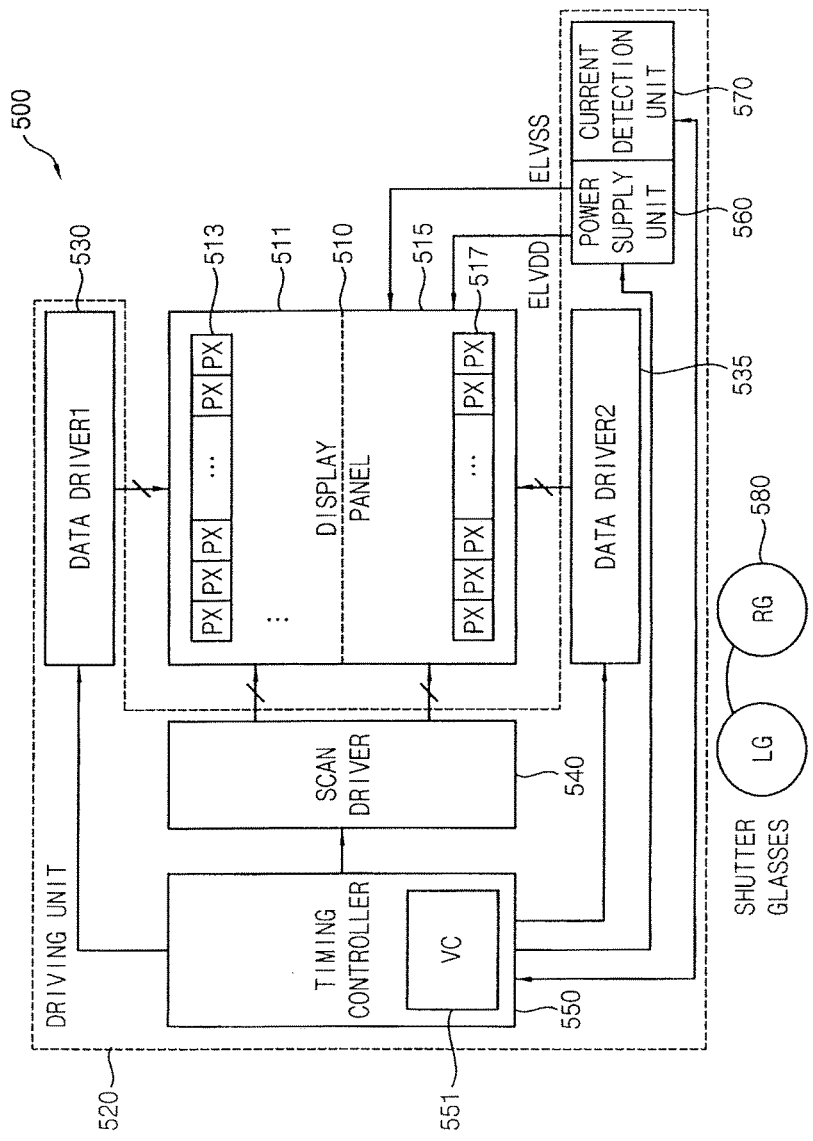
FIG. 15 illustrates another embodiment of an electroluminescent display device.
Figure 16:
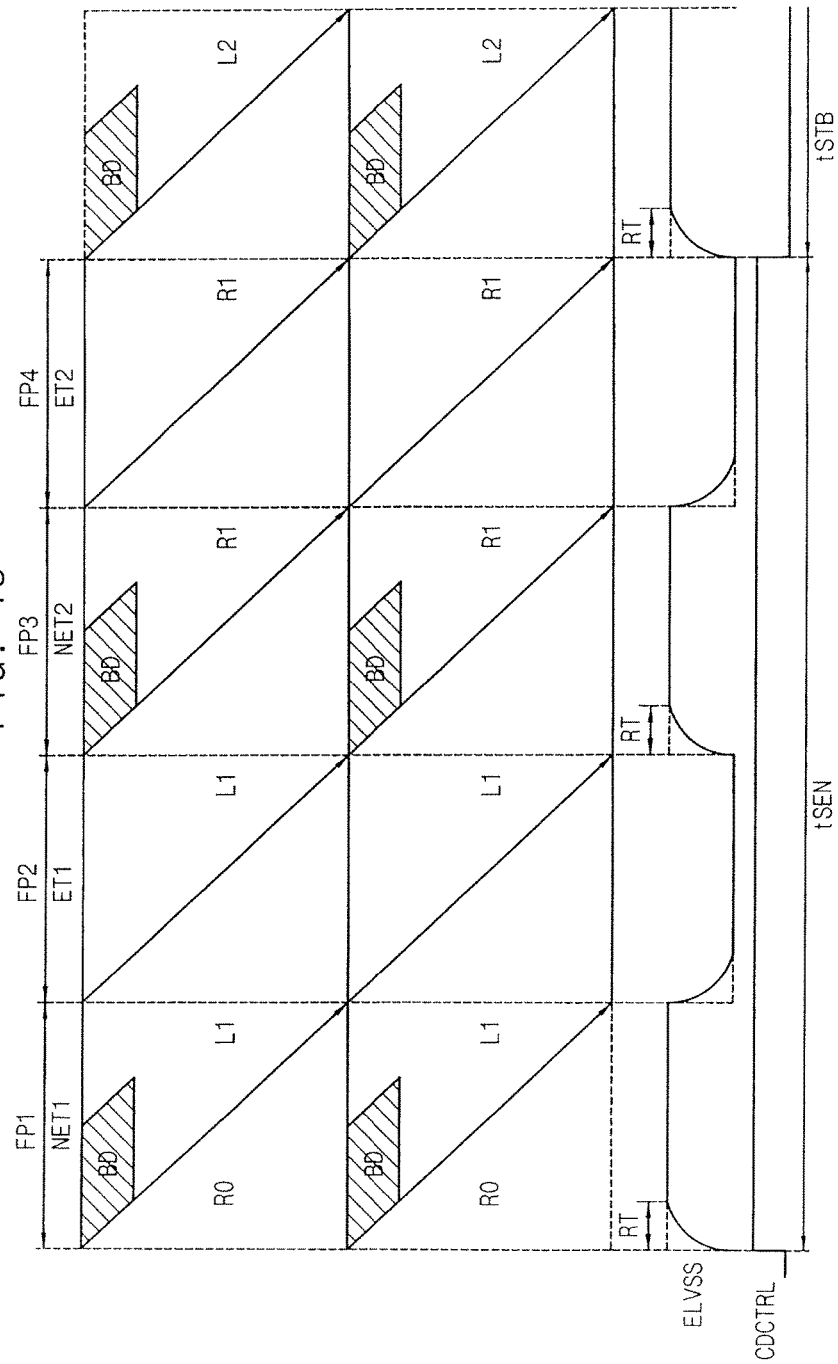
FIG. 16 illustrates an example of control signals for the electroluminescent display device in FIG. 15.
Figure 17:
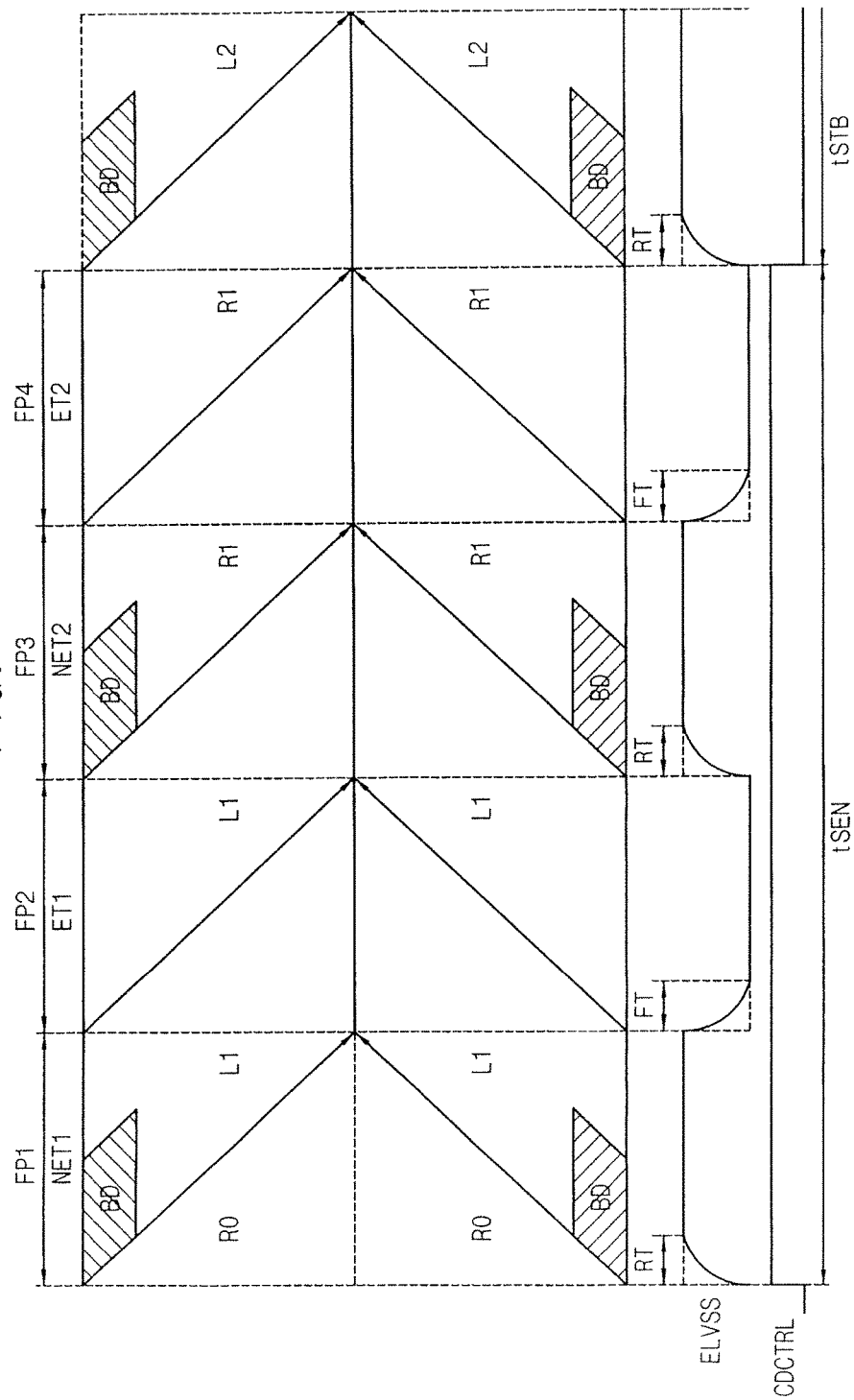
FIG. 17 illustrates another example of control signals for the electroluminescent display device in FIG. 15.

FIG. 15 illustrates another embodiment of an electroluminescent display device 500, FIG. 16 is a timing diagram illustrating an example of control signals for the electroluminescent display device 500, and FIG. 17 is a timing diagram illustrating another example of control signals the electroluminescent display device 500.

Referring to FIG. 15, the display device 500 includes a display panel 510 including a plurality of pixel rows 513 and 517 and a driving unit 520 that drives the display panel 510. The driving unit 520 includes first and second data drivers 530 and 535, a scan driver 540, a timing controller 550, a power supply unit 560, a current detection unit 570, and a voltage controller VC 551.

The display device 500 operates in a three-dimensional mode (or a stereoscopic mode) or a two-dimensional mode. In the three-dimensional mode, the display device 500 operates in synchronization with shutter glasses 580. The display device 500 may have a configuration similar to a display device 200 of FIG. 11, except that display device 500 includes two data drivers 530 and 535 and the display panel 510 includes upper and lower display panels 511 and 515 that are respectively driven by the different data drivers 530 and 535.

The display panel 510 may be divided into the upper display panel 511 including upper pixel rows 513 and the lower display panel 515 including lower pixel rows 517. The upper pixel rows 513 of the upper display panel 511 may receive data signals from the first data driver 530 and the lower pixel rows 517 of the lower display panel 515 may receive data signals from the second data driver 535. Thus, the upper pixel rows 513 may be respectively driven by different data drivers 530 and 535. In some example embodiments, the scan driver 540 may provide scan signals to the upper display panel 511 and the lower display panel 515. In other example embodiments, the display device 500 may include two scan drivers respectively providing the scan signals to the upper display panel 511 and the lower display panel 515.

In some example embodiments, as illustrated in FIG. 16, the driving unit 520 may sequentially write data (e.g., black data BD, left-eye image data L1 and L2, right-eye image data R1 and R2, or the like) to the upper pixel rows 513 in a first direction from the top to the bottom of the upper display panel 511 and may sequentially write data to the lower pixel rows 517 in the first direction from the top to the bottom of the lower display panel 515.

For example, the first data driver 530 may sequentially write the black data BD and the left-eye image data L1 to the upper pixel rows 513 in the first direction during a first frame period FP1. The first data driver 530 may sequentially write the left-eye image data L1 to the upper pixel rows 513 in the first direction during a second frame period FP2 and may sequentially write the black data BD and the right-eye image data R1 to the upper pixel rows 513 in the first direction during a third frame period FP3. The first data driver 530 may also sequentially write the right-eye image data R1 to the upper pixel rows 513 in the first direction during a fourth frame period FP4.

Further, the second data driver 535 may sequentially write the black data BD and the left-eye image data L1 to the lower pixel rows 517 in the first direction during the first frame period FP1 and may sequentially write the left-eye image data L1 to the lower pixel rows 517 in the first direction during the second frame period FP2. The second data driver 535 may also sequentially write the black data BD and the right-eye image data R1 to the lower pixel rows 517 in the first direction during the third frame period FP3 and may sequentially write the right-eye image data R1 to the lower pixel rows 517 in the first direction during the fourth frame period FP4.

As described above, since the first and second data drivers 530 and 535 write the black data BD to a portion of the upper pixel rows 513 and a portion of the lower pixel rows 517 during a portion of the first frame period FP1 and a portion of the third frame period FP3, crosstalk during a rising time of a lower power supply voltage ELVSS may be reduced or prevented.

In other example embodiments, as illustrated in FIG. 17, the driving unit 520 may sequentially write data to the upper pixel rows 513 in the first direction from the top to the bottom of the upper display panel 511, and may sequentially write data to the lower pixel rows 517 in a second direction from the bottom to the top of the lower display panel 515, opposite to the first direction. This data write operation or this scan operation performed in the directions from the top and the bottom of the display panel 510 to the center of the display panel 510 may be referred to as a "Chevron scanning."

In the display device 500 according to example embodiments, since the first and second data drivers 530 and 535 write the black data BD during the portion of the first frame period FP1 and the portion of the third frame period FP3, crosstalk during the rising time of the lower power supply voltage ELVSS may be reduced or prevented.

Further, by performing this Chevron scanning, a horizontal band at a low gray region, caused by a mismatch between the rising time RT and the falling time FT of the lower power supply voltage ELVSS, may be reduced or prevented from occurring at a center portion of the display panel 510, and instead occurs at the upper and lower portions of the display panel 510. This may further improve visibility or image quality of the display panel 510.

FIGS. 16 and 17 illustrates examples of data write directions or scan directions. The data write directions or scan directions of the display device may be different in another embodiment.

Figure 18:
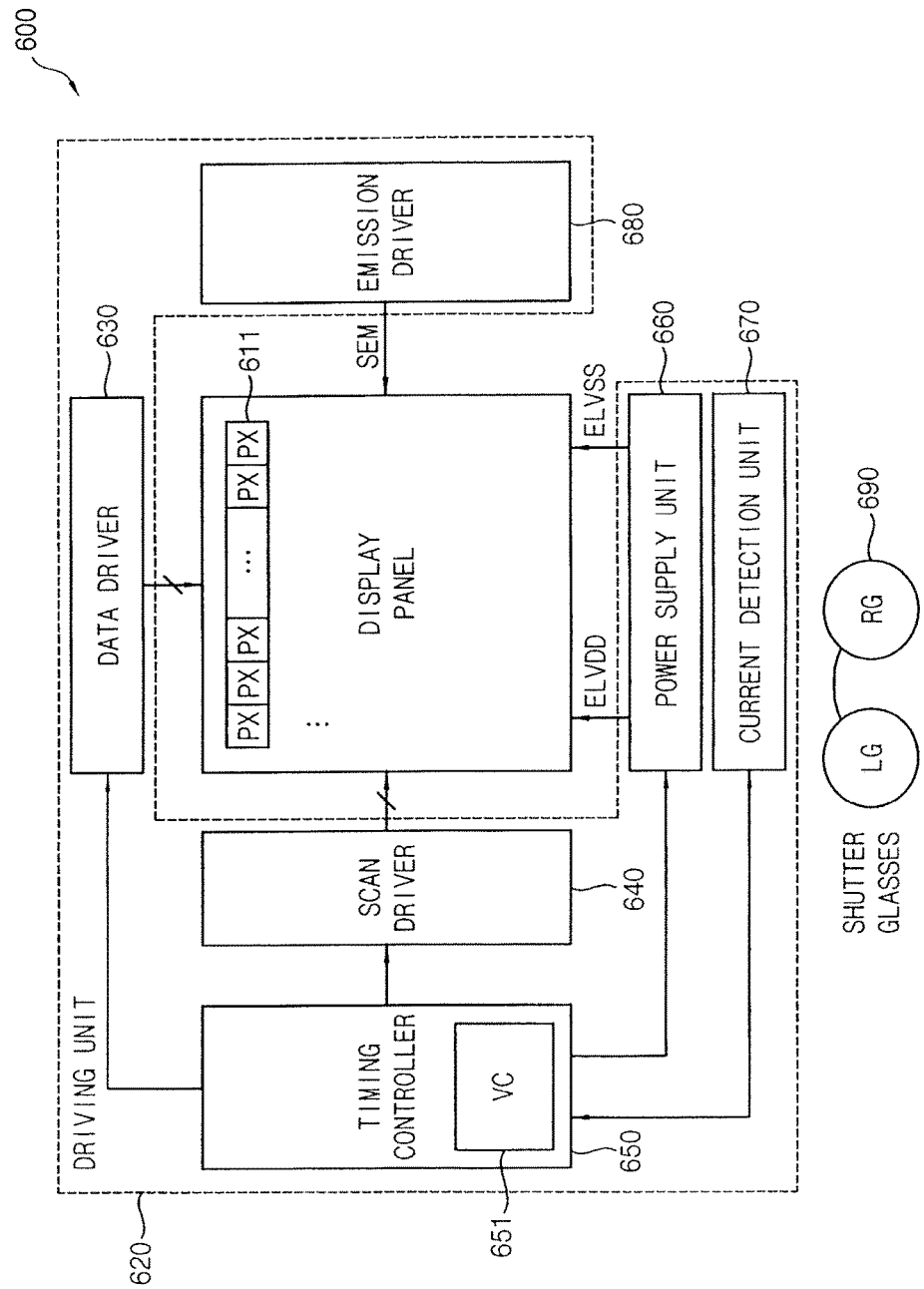
FIG. 18 illustrates another embodiment of an electroluminescent display device.
Figure 19:
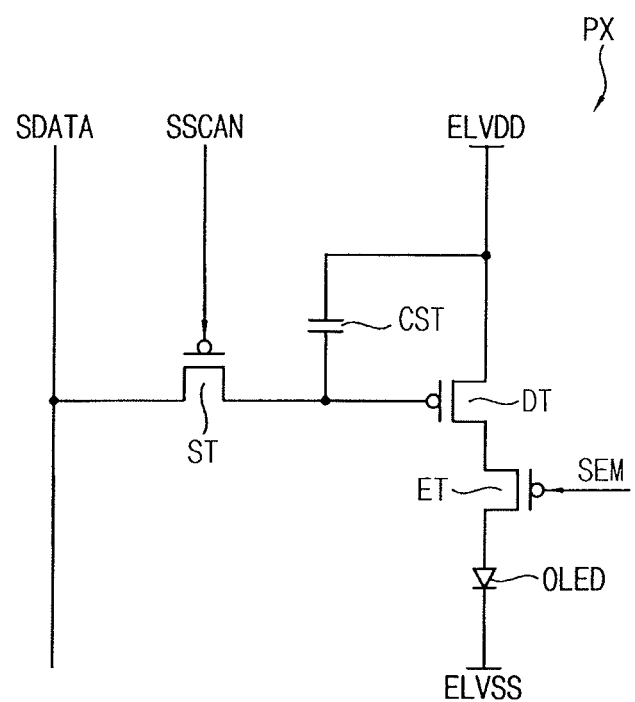
FIG. 19 illustrates another embodiment of a pixel.
Figure 20:
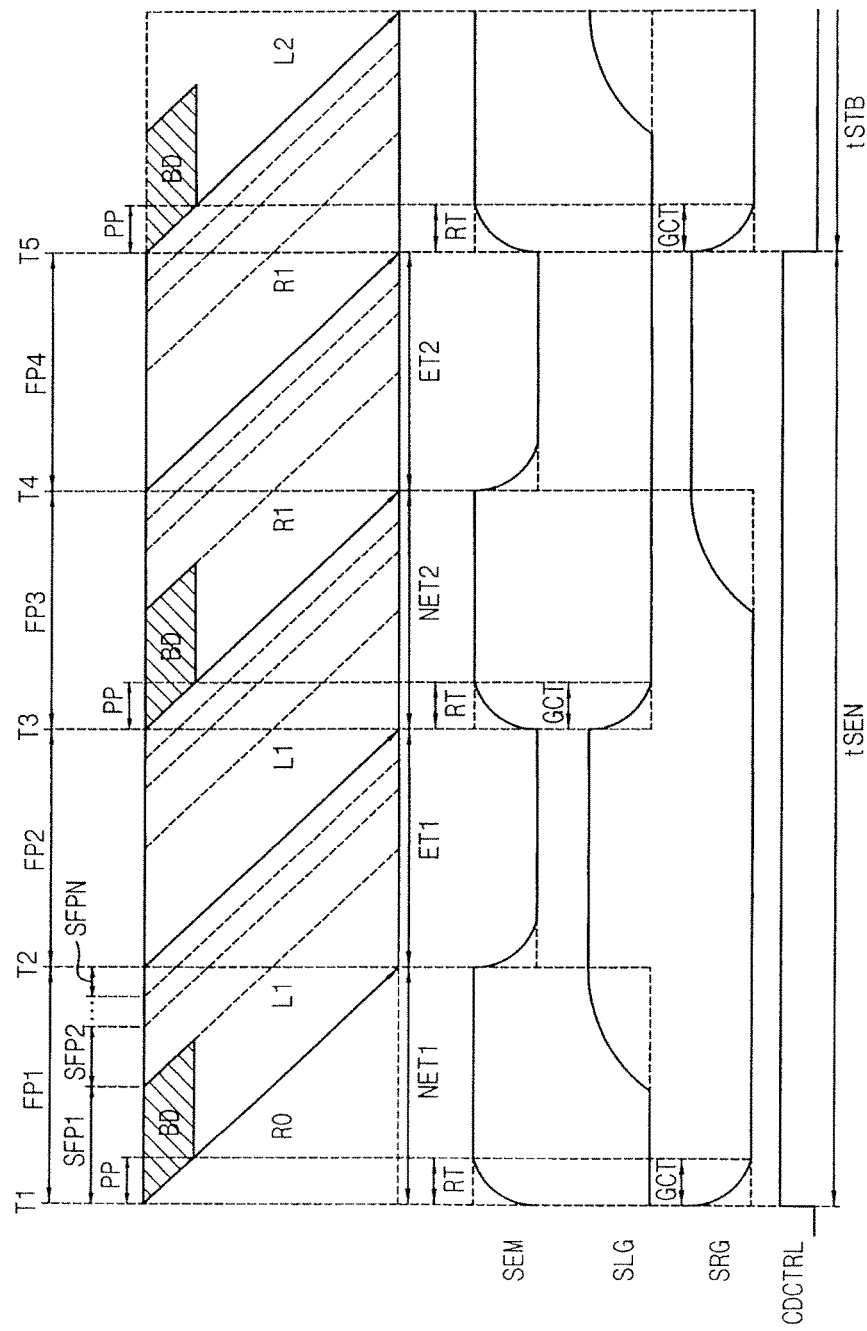
FIG. 20 illustrates an example of control signals for the electroluminescent display device in FIG. 18.

FIG. 18 illustrates another embodiment of an electroluminescent display device 600, FIG. 19 illustrating an embodiment of a pixel in the electroluminescent display device 600, and FIG. 20 is a timing diagram illustrating an example of control signals for the electroluminescent display device 600.

Referring to FIG. 18, the display device 600 includes a display panel 610 having a plurality of pixel rows 611 and a driving unit 620 that drives the display panel 610. The driving unit 620 includes a data driver 630, a scan driver 640, a timing controller 650, a power supply unit 660, a current detection unit 670, an emission driver 680, and a voltage controller 651. The display device 600 may operate in a three-dimensional mode (or a stereoscopic mode) and/or a two-dimensional mode. In the three-dimensional mode, the display device 600 may operate in synchronization with shutter glasses 690. The display device 600 may have a configuration similar to the display device 200 of FIG. 11, except that display device 600 includes the emission driver 680 and each pixel PX of FIG. 19 includes an emission control transistor.

The emission control driver 680 simultaneously applies an emission control signal SEM to all pixels PX in the display panel 610 to control all pixels PX to simultaneously emit or not to emit light. For example, the emission control driver 680 may simultaneously apply the emission control signal SEM having a first voltage level to all pixels PX during a non-emission time to prevent all pixels PX from emitting light, and may simultaneously apply the emission control signal SEM having a second voltage level to all pixels PX during an emission time to induce all pixels PX to simultaneously emit light.

Each pixel PX may or may not emit light based on the emission control signal SEM. In some example embodiments, as illustrated in FIG. 19, each pixel PX may include a switching transistor ST, a storage capacitor CST, a drive transistor DT, an emission control transistor ET, and an OLED. For example, the emission control transistor ET may be turned off when the emission control signal SEM has the first voltage level and may be turned on when the emission control signal SEM has the second voltage level. The OLED may emit light based on a current flowing from the high power supply voltage ELVDD to the low power supply voltage ELVSS while the drive transistor DT and the emission control transistor ET are turned on.

FIG. 20 illustrates an embodiment of a method for displaying a stereoscopic image by the display panel 600. Referring to FIGS. 18 and 20, the driving unit 620 may sequentially write black data BD to a portion of pixel rows 611 during a portion of a first sub-frame period SFP1 of a first frame period FP1, and may sequentially write left-eye image data L1 to the remaining portion of the pixel rows 611 during the remaining portion of the first sub-frame period SFP1 of the first frame period FP1. The driving unit 620 may also sequentially write the left-eye image data L1 to the pixel rows 611 during the respective second through N-th sub-frame periods SFP2 and SFPN of the first frame period FP1.

The driving unit 620 may simultaneously apply the emission control signal SEM having the first voltage level to the pixel rows 611 during a first non-emission time NET1 corresponding to the first frame period FP1. For example, when the emission control transistor in each pixel PX is a PMOS transistor, the first voltage level may be a high voltage level.

The driving unit 620 may sequentially write the left-eye image data L1 to the pixel rows 611 during respective first through N-th sub-frame periods SFP1, SFP2, and SFPN of a second frame period FP2. Further, the driving unit 620 may simultaneously apply the emission control signal SEM having the second voltage level to the pixel rows 611 during a first emission time ET1 corresponding to the second frame period FP2. During the first emission time ET1, the display panel 610 may display a left-eye image based on the left-eye image data L1 and a left-eye lens LG of the shutter glasses 680 may be open, thereby providing the left-eye image to a left-eye of a user.

The driving unit 620 may sequentially write the black data BD to the portion of the pixel rows 611 during a portion of a first sub-frame period SFP1 of a third frame period FP3, and may sequentially write right-eye image data R1 to the remaining portion of the pixel rows 611 during the remaining portion of the first sub-frame period SFP1 of the third frame period. The driving unit 620 may also sequentially write the right-eye image data R1 to the pixel rows 611 during the respective second through N-th sub-frame periods SFP2 and SFPN of the third frame period FP3. Further, the driving unit 620 may simultaneously apply the emission control signal SEM having the first voltage level to the pixel rows 611 during a second non-emission time NET2 corresponding to the third frame period FP3.

The driving unit 620 may sequentially write the right-eye image data R1 to the pixel rows 611 during respective first through N-th sub-frame periods SFP1, SFP2, and SFPN of a fourth frame period FP4. The driving unit 620 may simultaneously apply the emission control signal SEM having the second voltage level to the pixel rows 611 during a second emission time ET2 corresponding to the fourth frame period FP4. During the second emission time ET2, the display panel 610 may display a right-eye image based on the right-eye image data R1 and a right-eye lens RG of the shutter glasses 680 may be open. Therefore, the right-eye image is provided to the right-eye of the user.

The voltage level change of the emission control signal SEM at an end time point of the first emission period ET1 or a time point of the second emission period ET2 may be delayed by a transition period (e.g., a rising time RT) of the emission control signal SEM from the second voltage level to the first voltage level. However, in the display device 600, since the black data BD are written to the portion of the pixel rows 611 during the portion PP of the first frame period FP1 or the portion of the third frame period FP3, crosstalk during the transition period (or the rising time RT) of the emission control signal SEM may be reduced or prevented.

According to example embodiments, the voltage control period tVC of the three-dimensional mode may include a sensing time interval tSEN for sensing the global current GI and a standby time interval tSTB after the sensing time interval tSEN. In the three-dimensional mode, the sensing time interval tSEN may correspond to a plurality of frame periods and the standby time interval tSTB may correspond to at least one frame period.

The voltage controller 651 may generate the current detection control signal CDCTRL such that the activation level corresponds to the sensing time interval tSEN and the deactivation level corresponds to the standby time interval tSTB. As described above, the voltage controller 651 may increase the voltage control period tVC when the operation mode is changed from the two-dimensional mode to the three-dimensional mode and may decrease the voltage control period tVC when the operation mode is changed from the three-dimensional mode to the two-dimensional mode.

As such, the global current management (GCM) may be performed adaptively depending on the two-dimensional mode and the three-dimensional mode. Thus, power consumption may be reduced efficiently without degrading quality of displayed image when the operation mode is changed between the two-dimensional mode and the three-dimensional mode.

Figure 21:
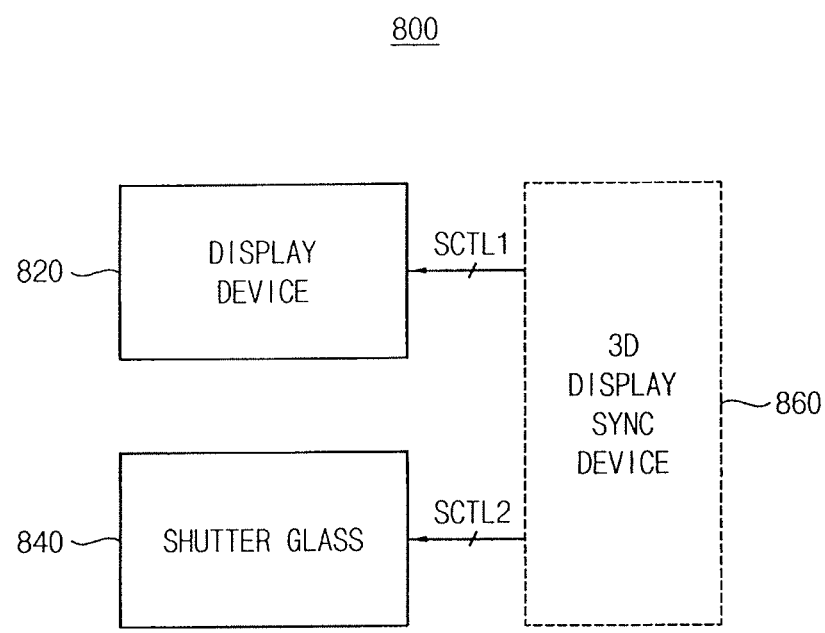
FIG. 21 illustrates an embodiment of a stereoscopic image display system.
Figure 22:
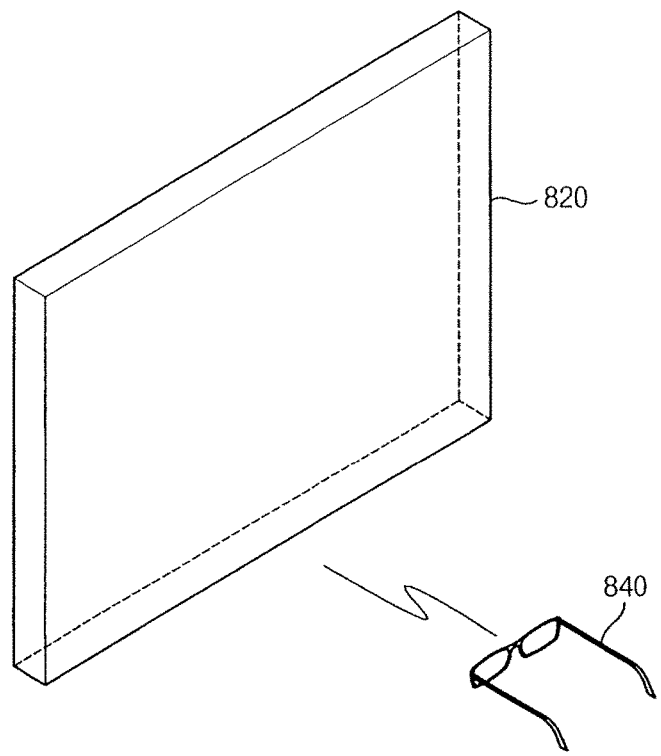
FIG. 22 illustrates a view of the stereoscopic image display system.

FIG. 21 illustrates an embodiment of a stereoscopic image display system 800, and FIG. 22 illustrates a conceptual view of the stereoscopic image display system 800. Referring to FIGS. 21 and 22, the stereoscopic image display system 800 includes an electoluminescent display device 820, shutter glasses 840, and a stereoscopic display synchronization device 860. Although FIG. 21 illustrates that stereoscopic image synchronization device 860 is outside the electoluminescent display device 820 and the shutter glasses 840, the stereoscopic display synchronization device 860 may be located within the electoluminescent display device 820 or the shutter glasses 840 in another embodiment.

The electoluminescent display device 820 may selective operate in the two-dimensional mode for displaying the planar images or in the three-dimensional mode for displaying the stereoscopic images. As described above, the electoluminescent display device 820 may generate the current detection signal CDET, representing the average value of the global current GI per voltage control period tVC, by sensing the global current GI provided to the display panel including pixels operating based on the high power supply voltage ELVDD and the low power supply voltage ELVDD.

The electoluminescent display device 820 may control at least one of the high power supply voltage ELVDD or the low power supply voltage ELVSS based on the current detection signal CDET, and may change the voltage control period tVC depending on the operation mode including the two-dimensional mode and the three-dimensional mode.

As such, the global current management (GCM) may be performed adaptively depending on the two-dimensional mode and the three-dimensional mode. Thus, power consumption may be reduced efficiently without degrading display quality when the operation mode is changed between the two-dimensional mode and the three-dimensional mode.

The shutter glasses 840 may open/close a left shutter and a right shutter in synchronization with the left image frame and the right image frame, respectively, based on the synchronization control signal SCTL1 and SCTL2. For example, the shutter glasses 840 may open the left shutter (e.g., close the right shutter) when the electroluminescent display device 820 displays the left image frame, and may open the right shutter (e.g., close the left shutter) when the electroluminescent display device 820 displays the right image frame.

For this operation, the stereoscopic display synchronization device 860 may provide the synchronization control signal SCTL1 and SCTL2 to the electroluminescent display device 820 and the shutter glasses 840, respectively. As a result, the shutter glasses 840 may open the left shutter (e.g., close the right shutter) when the electroluminescent display device 820 displays the left image frame, and the shutter glasses 840 may open the right shutter (e.g., close the left shutter) when the electroluminescent display device 820 displays the right image frame.

According to example embodiments, the stereoscopic display synchronization device 860 may provide the synchronization control signal SCTL1 and SCTL2 to the electroluminescent display device 820 and the shutter glasses 840, respectively, by wire and/or wireless communication links.

Figure 23:
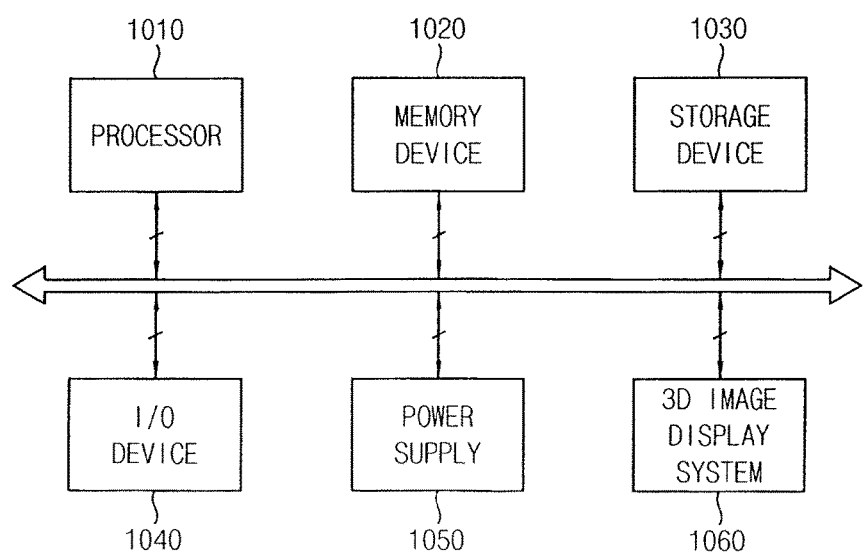
FIG. 23 illustrates an embodiment of an electronic device.

FIG. 23 illustrates an embodiment of an electronic device 1000 including the stereoscopic image display system of FIG. 21. Referring to FIG. 23, the electronic device 1000 may include a processor 1010, a memory device 1020, a storage device 1030, an input/output (I/O) device 1040, a power supply 1050, and a stereoscopic (3D) image display system 1060. The stereoscopic image display system 1060 may correspond to the stereoscopic image display system 800 of FIG. 21. In addition, the electronic device 1000 may include a plurality of ports for communicating a video card, a sound card, a memory card, a universal serial bus (USB) device, other electronic devices, etc.

The processor 1010 may perform various computing functions. The processor 1010 may be a micro-processor, a central processing unit (CPU), etc. The processor 1010 may be coupled to other components via an address bus, a control bus, a data bus, etc. Further, the processor 1010 may be coupled to an extended bus, such as a peripheral component interconnection (PCI) bus.

The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile dynamic random access memory (mobile DRAM) device, etc. The storage device 1030 may be a solid state drive (SSD) device, a hard disk drive (HDD) device, a CD-ROM device, etc.

The I/O device 1040 may be an input device such as a keyboard, a keypad, a mouse, a touchpad, a touch-screen, a remote controller, etc., and an output device such as a printer, a speaker, etc. In some example embodiments, the stereoscopic image display system 1060 may be included in the I/O device 1040. The power supply 1050 may provide a power for operations of the electronic device 1000. The stereoscopic image display system 1060 may communicate with other components via the buses or other communication links.

As described above with reference to FIG. 21, the stereoscopic image display system 1060 may include an electroluminescent display device such as an organic light emitting display device, shutter glasses, and a stereoscopic display synchronization device. The electroluminescent display device may generate the current detection signal CDET, representing the average value of the global current GI per voltage control period tVC, by sensing the global current GI provided to the display panel including the pixels operating based on the high power supply voltage ELVDD and the low power supply voltage ELVDD.

The electroluminescent display device may control at least one of the high power supply voltage ELVDD and the low power supply voltage ELVSS based on the current detection signal CDET, and change the voltage control period tVC depending on the operation mode including the two-dimensional mode and the three-dimensional mode.

As such, the global current management (GCM) may be performed adaptively depending on the two-dimensional mode and the three-dimensional mode. Thus, power consumption may be reduced efficiently without degrading quality of displayed image when the operation mode is changed between the two-dimensional mode and the three-dimensional mode.

The above described embodiments may be applied to various kinds of devices and systems such as a mobile phone, a smart phone, a tablet computer, a laptop computer, a personal digital assistant PDA, a portable multimedia player PMP, a digital television, a digital camera, a portable game console, a music player, a camcorder, a video player, a navigation system, etc.

By way of summation and review, most images between the frames have continuity in the two-dimensional mode and the global current GI may be measured by setting the voltage control period tVC to one frame period. In case of the three-dimensional mode, however, it is difficult to measure the global current GI due to specialty of the three-dimensional digital driving. For example, when the luminance between the left eye images and the right eye images is significant, fluctuation of the global current GI increases. Also, display quality may degrade if the driving voltage is controlled based on measurement of the global current GI as the two-dimensional mode.

In accordance with one or more of the aforementioned embodiments, the voltage control period tVC is changed based on the operation mode. For example, the voltage control period tVC is increased when the operation mode changes from the two-dimensional mode to the three-dimensional mode, and the voltage control period tVC is decreased when the operation mode changes from the three-dimensional mode to the two-dimensional mode.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A method for driving an electroluminescent display device, the method comprising:
generating a current detection signal corresponding to an average value of a global current per voltage control period based on the global current provided to the display device;
controlling at least one of a first power supply voltage or a second power supply voltage based on the current detection signal; and
changing the voltage control period based on an operation mode of the display device, the display device operating in a two-dimensional mode for displaying a planar image and a three-dimensional mode for displaying a stereoscopic image, wherein controlling at least one of the first power supply voltage or the second power supply voltage includes:
calculating a target value of the global current based on input image data;
calculating a voltage offset based on the target value and the average value of the global current; and
controlling a voltage level of the first power supply voltage based on the voltage offset, and wherein calculating the voltage offset includes:
calculating a compensated target value corresponding to a half of the target value or a compensated average value corresponding to double the average value in the three-dimensional mode;
calculating a first difference between the compensated target value and the average value or a second difference between the target value and the compensated average value; and
calculating the voltage offset based on the first difference or the second difference.

2. The method as claimed in claim 1, wherein changing the voltage control period includes:
increasing the voltage control period when the operation mode is to change from the two-dimensional mode to the three-dimensional mode, and
decreasing the voltage control period when the operation mode is to change from the three-dimensional mode to the two-dimensional mode.

3. The method as claimed in claim 1, wherein the voltage control period of the three-dimensional mode includes a sensing time interval for sensing the global current and a standby time interval after the sensing time interval.

4. The method as claimed in claim 3, wherein:
in the three-dimensional mode, the sensing time interval corresponds to a plurality of frame periods and the standby time interval corresponds to at least one frame period.

5. The method as claimed in claim 1, wherein the voltage control period of the two-dimensional mode corresponds to one frame period.

6. The method as claimed in claim 1, wherein generating the current detection signal includes:
generating a red current detection signal representing an average value of a red global current per voltage control period by sensing the red global current provided to red pixels in the display device;
generating a green current detection signal representing an average value of a green global current per voltage control period by sensing the green global current provided to green pixels in the display device; and
generating a blue current detection signal representing an average value of a blue global current per voltage control period by sensing the blue global current provided to blue pixels in the display device.

7. The method as claimed in claim 6, wherein controlling at least one of the first power supply voltage or the second power supply voltage includes:
controlling a red first power supply voltage provided to the red pixels based on the red current detection signal;
controlling a green first power supply voltage provided to the green pixels based on the green current detection signal; and
controlling a blue first power supply voltage provided to the blue pixels based on the blue current detection signal.

8. The method as claimed in claim 1, further comprising:
alternatively displaying a left-eye image and a right-eye image forming the stereoscopic image in the three-dimensional mode.

9. The method as claimed in claim 8, wherein alternatively displaying the left-eye image and the right-eye image includes:
sequentially writing black data to a portion of pixel rows during a portion of a first frame period;

sequentially writing left-eye image data to the pixel rows during the remaining portion of the first frame period and during a second frame period;

driving the pixel rows to simultaneously emit light during a first emission period corresponding to the second frame period;

sequentially writing the black data to the portion of the pixel rows during a portion of a third frame period;

sequentially writing right-eye image data to the pixel rows during the remaining portion of the third frame period and during a fourth frame period; and driving the pixel rows to simultaneously emit light during a second emission period corresponding to the fourth frame period.

10. The method as claimed in claim 9, further comprising:

applying a low power supply voltage having a first voltage level to the pixel rows during a first non-emission period corresponding to the first frame period and during a second non-emission period corresponding to the third frame period such that the pixel rows do not emit light; and applying the low power supply voltage having a second voltage level lower than the first voltage level to the pixel rows during the first emission period and during the second emission period such that the pixel rows emit light.

11. The method as claimed in claim 9, further comprising:

applying an emission control signal having a first voltage level to the pixel rows during a first non-emission period corresponding to the first frame period and during a second non-emission period corresponding to the third frame period such that the pixel rows do not emit light; and applying the emission control signal having a second voltage level to the pixel rows during the first emission period and during the second emission period such that the pixel rows emit light.

12. The method as claimed in claim 9, wherein:

the display device includes an upper display panel having upper pixel rows of the pixel rows and a lower display panel having lower pixel rows of the pixel rows and the upper display panel and the lower display panel are respectively driven by different data drivers.

13. The method as claimed in claim 12, wherein:

the black data, the left-eye image data, and the right-eye image data are sequentially written to the upper pixel rows in a first direction from top to bottom of the upper display panel, and the black data, the left-eye image data and the right-eye image data are sequentially written to the lower pixel rows in the first direction from the top to the bottom of the lower display panel.

14. The method as claimed in claim 12, wherein:

the black data, the left-eye image data, and the right-eye image data are sequentially written to the upper pixel rows in a first direction from top to bottom of the upper display panel, and the black data, the left-eye image data, and the right-eye image data are sequentially written to the lower pixel rows in a second direction from the bottom to the top of the lower display panel.

15. An electroluminescent display device, comprising:

a display panel including a plurality of pixels operating based on a first power supply voltage and a second power supply voltage;

a power supply to generate the first power supply voltage and the second power supply voltage based on an input voltage and a voltage control signal;

a current detector to generate a current detection signal, representing an average value of a global current per voltage control period, by sensing the global current provided to the display panel based on a current detection control signal representing the voltage control period; and a voltage controller to generate the current detection control signal, such that the voltage control period is changed depending on an operation mode of the display device, wherein the display device is to operate in a two-dimensional mode for displaying a planar image or a three-dimensional mode for displaying a stereoscopic image, wherein the voltage controller is to generate the voltage control signal, based on the current detection signal, to control at least one of the first power supply voltage or the second power supply voltage, wherein the voltage controller is to:

calculate a target value of the global current based on input image data;

calculate a voltage offset based on the target value and the average value of the global current; and control a voltage level of the first power supply voltage based on the voltage offset, and wherein voltage controller is to calculate the voltage offset by:

calculating a compensated target value corresponding to a half of the target value or a compensated average value corresponding to double the average value in the three-dimensional mode;

calculating a first difference between the compensated target value and the average value or a second difference between the target value and the compensated average value; and calculating the voltage offset based on the first difference or the second difference.

16. A system, comprising:

an electroluminescent display device to selectively operate in a two-dimensional mode for displaying a planar image or in a three-dimensional mode for displaying a stereoscopic image based on a synchronization control signal;

a shutter glasses to alternately open a left shutter and a right shutter based on the synchronization control signal; and a stereoscopic display synchronization device to generate the synchronization control signal, such that the shutter glasses open the left shutter when the electroluminescent display device displays a left image of the stereoscopic image and the shutter glasses open the right shutter when the electroluminescent display device displays a right image of the stereoscopic image, wherein the electroluminescent display device is to:

generate a current detection signal, representing an average value of a global current per voltage control period, by sensing the global current provided to a display panel including a plurality of pixels operating based on a first power supply voltage and a second power supply voltage, control at least one of the first power supply voltage or the second power supply voltage based on the current detection signal, and change the voltage control period depending on whether the display device is operating in the three-dimensional mode or the two-dimensional mode, the electroluminescent display device to control at least one of the first power supply voltage or the second power supply voltage by:

calculating a target value of the global current based on input image data;

calculating a voltage offset based on the target value and the average value of the global current; and controlling a voltage level of the first power supply voltage based on the voltage offset, and wherein calculating the voltage offset includes:

calculating a compensated target value corresponding to a half of the target value or a compensated average value corresponding to double the average value in the three-dimensional mode;

calculating a first difference between the compensated target value and the average value or a second difference between the target value and the compensated average value; and calculating the voltage offset based on the first difference or the second difference.

* * * * *